(12) United States Patent
Wright et al.

(10) Patent No.: US 11,118,290 B2
(45) Date of Patent: Sep. 14, 2021

(54) STRUCTURED, DISPERSIBLE NONWOVEN WEB COMPRISED OF HYDROENTANGLED INDIVIDUALIZED BAST FIBERS

(71) Applicant: GPCP IP Holdings LLC, Atlanta, GA (US)

(72) Inventors: Alan E. Wright, Roswell, GA (US); Micheal S. Lerch, Roswell, GA (US); Joseph H. Miller, Neenah, WI (US); Dean J. Baumgartner, Bonduel, WI (US); Greg Wendt, Neenah, WI (US); Daniel Sumnicht, Hobart, WI (US); Leonard E. Duello, Appleton, WI (US); David W. White, Clintonville, WI (US); Tom J. Daul, Oneida, WI (US); Kip K. Decker, Neenah, WI (US); Samuel C. Baer, Atlanta, GA (US)

(73) Assignee: GPCP IP Holdings LLC, Atlanta, GA (US)

( * ) Notice: Subject to any disclaimer, the term of this patent is extended or adjusted under 35 U.S.C. 154(b) by 81 days.

(21) Appl. No.: 15/502,236

(22) PCT Filed: Aug. 7, 2015

(86) PCT No.: PCT/US2015/044138
§ 371 (c)(1),
(2) Date: Feb. 7, 2017

(87) PCT Pub. No.: WO2016/022880
PCT Pub. Date: Feb. 11, 2016

(65) Prior Publication Data
US 2017/0233909 A1 Aug. 17, 2017

Related U.S. Application Data

(60) Provisional application No. 62/034,197, filed on Aug. 7, 2014.

(51) Int. Cl.
*B32B 5/06* (2006.01)
*D04H 1/425* (2012.01)
(Continued)

(52) U.S. Cl.
CPC ............... *D04H 1/425* (2013.01); *B32B 5/06* (2013.01); *B32B 5/26* (2013.01); *D04H 1/4374* (2013.01);
(Continued)

(58) Field of Classification Search
CPC .. B32B 3/26; B32B 3/263; B32B 5/06; B32B 5/26; B32B 2250/20; B32B 2262/062;
(Continued)

(56) References Cited

U.S. PATENT DOCUMENTS 3,485,706 A 12/1969 Evans
3,554,862 A 1/1971 Hervey et al.
(Continued)

FOREIGN PATENT DOCUMENTS

CA 841938 A 5/1970
CN 102578944 A 7/2012
(Continued)

OTHER PUBLICATIONS

European Patent Office Supplementary European Search Report and Written Opinion for Application EP 15829469; dated Jun. 27, 2017; 4 pages.
(Continued)

*Primary Examiner* — Megha M Gaitonde

(57) ABSTRACT

A water-dispersible nonwoven substrate includes a structured web of fibers. The structured web has a first surface and a second surface. The first surface has substantially filled protrusions extending outwardly from the first surface and connecting regions disposed between the protrusions. The average fiber densities of the protrusions and connecting
(Continued)

regions are substantially the same, and the fibers are individualized plant-based fibers, reconstituted cellulosic fibers, or a combination thereof.

15 Claims, 6 Drawing Sheets

(51) Int. Cl.
D04H 1/4374 (2012.01)
D04H 1/495 (2012.01)
D04H 1/498 (2012.01)
B32B 5/26 (2006.01)

(52) U.S. Cl.
CPC ............. *D04H 1/495* (2013.01); *D04H 1/498* (2013.01); *B32B 2250/20* (2013.01); *B32B 2262/062* (2013.01); *B32B 2307/718* (2013.01); *B32B 2555/00* (2013.01)

(58) Field of Classification Search
CPC .......... B32B 2307/718; B32B 2555/00; B32B 2432/00; D04H 1/425; D04H 1/495; D04H 1/498; Y10T 428/24149; Y10T 428/24157; Y10T 428/24174; Y10T 428/24355; Y10T 428/24405; Y10T 428/24479; Y10T 428/24496; Y10T 428/24504; Y10T 428/24537; Y10T 428/24554; Y10T 428/2457; Y10T 428/24603; Y10T 428/24942
USPC ........ 428/116, 117, 119, 141, 147, 156, 158, 428/159, 163, 165, 167, 171, 172, 212, 428/219; 15/208, 209.1; 162/109, 115, 162/141, 146, 148, 157.6
See application file for complete search history.

(56) References Cited

U.S. PATENT DOCUMENTS

| | | | |
|---|---|---|---|
| 3,563,241 A | 2/1971 | Evans et al. | |
| 3,917,785 A | 11/1975 | Kalwaites | |
| 4,014,635 A | 3/1977 | Kroyer | |
| 4,144,122 A | 3/1979 | Emanuelsson et al. | |
| 4,476,323 A | 10/1984 | Hellsten et al. | |
| 4,559,157 A | 12/1985 | Smith et al. | |
| 4,640,810 A | 2/1987 | Laursen et al. | |
| 4,667,890 A | 5/1987 | Gietman, Jr. | |
| 4,690,821 A | 9/1987 | Smith et al. | |
| 4,822,452 A | 4/1989 | Tse et al. | |
| 4,925,528 A | 5/1990 | Tse et al. | |
| 5,158,523 A | 10/1992 | Houk et al. | |
| 5,238,534 A | 8/1993 | Manning et al. | |
| 5,433,817 A | 7/1995 | Biagiotti et al. | |
| 5,573,637 A | 11/1996 | Ampulski et al. | |
| 5,891,126 A | 4/1999 | Osborn, III et al. | |
| 5,958,186 A | 9/1999 | Holm et al. | |
| 6,037,407 A | 3/2000 | Derian et al. | |
| 6,051,749 A | 4/2000 | Schulz | |
| 6,423,397 B1 | 7/2002 | Roussel | |
| 6,753,063 B1 | 6/2004 | Pung et al. | |
| 6,994,865 B2 | 2/2006 | Branham et al. | |
| 7,250,382 B2* | 7/2007 | Takai | D21H 11/12 428/292.1 |
| 7,566,014 B2 | 7/2009 | Koslow et al. | |
| 8,133,825 B2 | 3/2012 | Bunyard et al. | |
| 8,178,025 B2 | 5/2012 | Awofeso et al. | |
| 2003/0100240 A1* | 5/2003 | Takai | D21H 25/005 442/408 |
| 2003/0211802 A1 | 11/2003 | Keck | |
| 2006/0237154 A1 | 10/2006 | Edwards et al. | |
| 2008/0233382 A1 | 9/2008 | Simmons et al. | |
| 2009/0311481 A1 | 12/2009 | Morin et al. | |
| 2011/0230570 A1* | 9/2011 | Kwon | A61K 8/0212 514/783 |
| 2012/0021171 A1 | 1/2012 | Riviere et al. | |
| 2012/0144611 A1 | 6/2012 | Baker et al. | |
| 2012/0199301 A1* | 8/2012 | Strandqvist | D04H 1/26 162/146 |
| 2012/0227203 A1* | 9/2012 | Ouellette | B32B 5/022 15/209.1 |
| 2012/0238982 A1 | 9/2012 | Weisman et al. | |
| 2013/0220151 A1 | 8/2013 | Sauter et al. | |
| 2014/0066872 A1* | 3/2014 | Baer | B32B 5/26 428/196 |
| 2014/0170402 A1 | 6/2014 | Knowlson et al. | |
| 2016/0355857 A1* | 12/2016 | Hiltunen | C08B 15/02 |

FOREIGN PATENT DOCUMENTS

| | | |
|---|---|---|
| CN | 103429277 A | 12/2013 |
| EP | 0303528 A1 | 2/1989 |
| EP | 0408199 A1 | 6/1990 |
| EP | 931862 A1 * | 7/1999 |
| EP | 1302592 A1 | 4/2003 |
| WO | 9710100 A1 | 3/1997 |
| WO | 9826808 A2 | 6/1998 |
| WO | 03099886 A1 | 12/2003 |
| WO | 2007140578 A1 | 12/2007 |
| WO | 2015023558 A1 | 2/2015 |

OTHER PUBLICATIONS

International Search Report for International Patent Application PCT/US2015/044138; dated Oct. 23, 2015; International Filing Date: Aug. 7, 2015; Priority Date: Aug. 7, 2014; 7 pages.
Written Opinion for International Patent Application PCT/US2015/044138; dated Oct. 23, 2015; International Filing Date Aug. 7, 2015; Priority Date Aug. 7, 2014; 3 pages.
Chemical Week Publication; "New Chemical Perspectives"; Soap and Cosmetics; Mar. 2000; p. 4, p. 12-13.
INDA Guidelines FG 511.2 Dispersibility Tipping Tube Test, pp. 89-97.
Lee et al., "Antimicrobial and Blood Repellent Finishes for Cotton and Nonwoven Fabrics Based on Chitosan and Fluropolymers", Textile Research Journal, Feb. 1999; pp. 104-112; vol. 69 (2).

* cited by examiner

STRUCTURED, DISPERSIBLE NONWOVEN WEB COMPRISED OF HYDROENTANGLED INDIVIDUALIZED BAST FIBERS

CROSS-REFERENCE TO RELATED APPLICATIONS

This is a National Stage application under 35 U.S.C. § 371 of PCT/US2015/044138, filed on Aug. 7, 2015, and published as WO 2016/022880, which claims priority to U.S. Provisional Patent Application No. 62/034,197, filed on Aug. 7, 2014, which are both incorporated by reference herein.

TECHNICAL FIELD OF THE INVENTION

The present disclosure relates generally to nonwoven substrates. More specifically, the present disclosure relates to water-dispersible nonwoven substrates.

BACKGROUND OF THE INVENTION

Disposable, water dispersible wipe and tissue products are convenient, relatively inexpensive, sanitary, and easy to use. Personal care wipes are convenient because they are portable, suitable for travel, and versatile. Examples of disposable wipes include wet wipes (or wipers), e.g., baby wipes and cosmetic wipes. In addition to personal care wipes, disposable household wipes include kitchen cleaning wipes and dusting wipes.

Although convenient, discarding disposable wipes can be problematic when the wipe substrates are not biodegradable or not "flushable." "Flushable" refers to an ability to evacuate a toilet. Wipe substrates that are not biodegradable or flushable can accumulate in landfills. However, even "flushable" wipe substrates may not be made of materials that are substantially water dispersible. In particular, a wipe substrate's ability to evacuate a toilet can be merely due to small size. Thus, wipes that do not disintegrate or substantially disperse in water or are biodegradable have disadvantages because they can plug screens and jam pumps in sewage treatment plants.

Accordingly, there is a need for a biodegradable, water dispersible wipe that employs a nonwoven substrate, or a multi-ply structure, made of individualized, natural fibers. It is to solving this problem the present invention is directed.

SUMMARY OF THE INVENTION

The present disclosure is directed to nonwoven substrates. In one aspect, a water-dispersible nonwoven substrate includes a structured web of fibers. The structured web has a first surface and a second surface. The first surface has substantially filled protrusions extending outwardly from the first surface, and the portions of the web between the protrusions define connecting regions disposed between the protrusions. The average fiber densities of the protrusions and connecting regions are substantially the same, and the fibers are individualized plant-based fibers, reconstituted cellulosic fibers, or a combination thereof.

In another aspect, a water-dispersible nonwoven substrate includes at least two plies of a structured web of fibers having a first surface and a second surface. The first surface has substantially filled protrusions extending outwardly from the first surface, and the portions of the web between the protrusions define connecting regions disposed between the protrusions. The average fiber densities of the protrusions and connecting regions are substantially the same, and the fibers are individualized plant-based fibers, reconstituted cellulosic fibers, or a combination thereof.

Yet, in another aspect, a method of making a water-dispersible nonwoven substrate comprising a structured web includes forming a web of fibers and entangling the fibers on a perforated surface to form the structured web. The structured web has a first surface and a second surface. The first surface has substantially filled protrusions extending outwardly from the first surface, and the portions of the web between the protrusions define connecting regions disposed between the protrusions. The average fiber densities of the protrusions and connecting regions are substantially the same, and the fibers are individualized plant-based fibers, reconstituted cellulosic fibers, or a combination thereof.

Still yet, in another aspect, a water-dispersible multi-ply nonwoven substrate includes at least two plies of a web of fibers. The fibers are individualized plant-based fibers, reconstituted cellulosic fibers, or a combination thereof. In another aspect, a method of making a water-dispersible multi-ply nonwoven substrate includes forming two webs of fibers, entangling the fibers of each web to form a first ply and a second ply, and disposing the first ply onto the second ply to form the multi-ply nonwoven substrate. The fibers are individualized plant-based fibers, regenerated cellulosic fibers, or a combination thereof.

In one aspect, a water-dispersible nonwoven substrate includes a structured web including cellulosic fibers, the structured web having a first surface and a second surface, the first surface having substantially filled protrusions extending outwardly from the first surface, and the portions of the web between the protrusions defining connecting regions disposed between the protrusions; wherein the average fiber densities of the protrusions and connecting regions are substantially the same; or at least two plies of an unstructured web including cellulosic fibers. In another aspect, a multi-ply water-dispersible nonwoven substrate includes at least two plies of the water-dispersible nonwoven substrate, and at least one of the two plies includes the structured web, and the remainder of the at least two plies includes one or more plies of the structured web, one or more plies of the unstructured web, or any combination thereof.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the present invention. It is important, therefore, that the claims be regarded as including such equivalent constructions insofar as they do not depart from the spirit and scope of the present invention.

Other advantages and capabilities of the invention will become apparent from the following description taken in conjunction with the examples showing aspects of the present invention.

BRIEF DESCRIPTION OF THE SEVERAL VIEWS OF THE DRAWINGS

The invention will be better understood and the above object as well as other objects other than those set forth above will become apparent when consideration is given to the following detailed description thereof. Such description makes reference to the annexed drawing wherein.

DETAILED DESCRIPTION OF INVENTION

Figure 1:
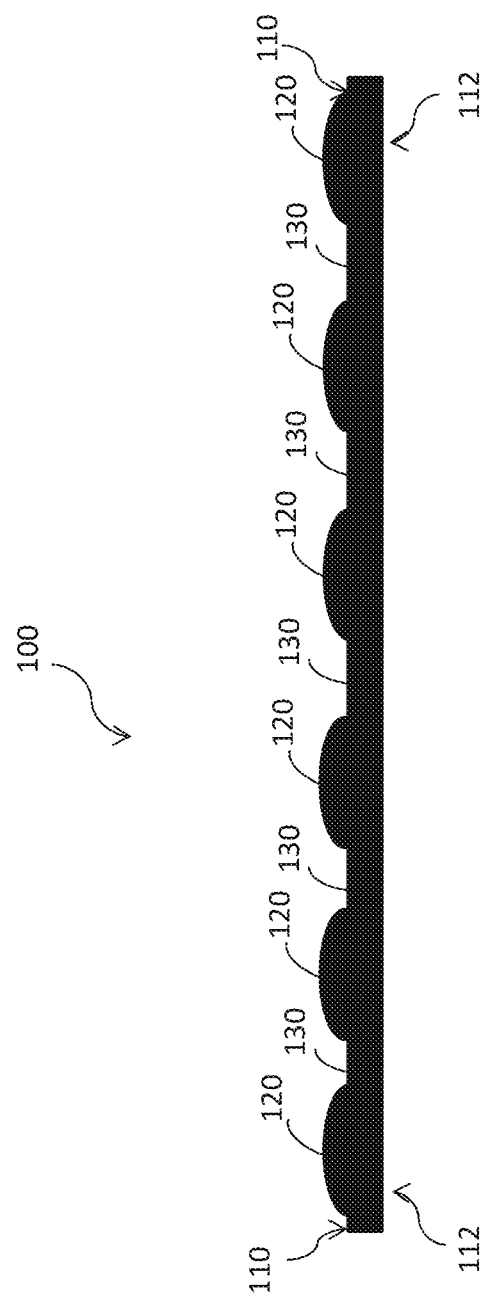
FIG. 1 illustrates an exemplary diagram of a cross-sectional view of the structured web.

For a fuller understanding of the nature and desired objects of this invention, reference should be made to the above and following detailed description taken in connection with the accompanying figures. When reference is made to the figures, like reference numerals designate corresponding parts throughout the several figures.

Disclosed herein are nonwoven substrates. In one aspect, a water-dispersible nonwoven substrate includes a structured web of fibers. The structured web has a first surface and a second surface. The first surface has substantially filled protrusions extending outwardly from the first surface, and the portions of the web between the protrusions define connecting regions disposed between the protrusions. The average fiber densities of the protrusions and connecting regions are substantially the same, and the fibers are individualized plant-based fibers, reconstituted cellulosic fibers, or a combination thereof.

In another aspect, a water-dispersible nonwoven substrate includes at least two plies of a structured web of fibers having a first surface and a second surface. The first surface has substantially filled protrusions extending outwardly from the first surface, and the portions of the web between the protrusions define connecting regions disposed between the protrusions. The average fiber densities of the protrusions and connecting regions are substantially the same, and the fibers are individualized plant-based fibers, reconstituted cellulosic fibers, or a combination thereof.

Yet, in another aspect, a method of making a water-dispersible nonwoven substrate comprising a structured web includes forming a web of fibers and entangling the fibers on a perforated surface to form the structured web. The structured web has a first surface and a second surface. The first surface has substantially filled protrusions extending outwardly from the first surface, and the portions of the web between the protrusions define connecting regions disposed between the protrusions. The average fiber densities of the protrusions and connecting regions are substantially the same, and the fibers are individualized plant-based fibers, reconstituted cellulosic fibers, or a combination thereof.

Still yet, in another aspect, a water-dispersible multi-ply nonwoven substrate includes at least two plies of a web of fibers. The fibers are individualized plant-based fibers, reconstituted cellulosic fibers, or a combination thereof. In another aspect, a method of making a water-dispersible multi-ply nonwoven substrate includes forming two webs of fibers, entangling the fibers of each web to form a first ply and a second ply, and disposing the first ply onto the second ply to form the multi-ply nonwoven substrate. The fibers are individualized plant-based fibers, regenerated cellulosic fibers, or a combination thereof.

Terminology used herein is given its ordinary meaning consistent with the exemplary definitions set forth immediately below; mils refers to thousandths of an inch; mg refers to milligrams and $m^2$ refers to square meters, percent means weight percent (dry basis), "ton" means short ton (2,000 pounds) and so forth.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions in the real world. Furthermore, variation can occur from inadvertent error in measuring procedures, differences in the manufacture, source, or purity of the ingredients employed to make the compositions or carry out the methods, and the like. Whether or not modified by the term "about," the claims include equivalents to the quantities. In one aspect, the term "about" means within 10% of the reported numerical value. In another aspect, the term about means within 5% of the reported numerical value.

As used herein, the terms "cellulosic" and "cellulose," when used in reference to fibers, mean comprising cellulose. Cellulose fibers include natural cellulose fibers, secondary or recycled fibers, regenerated fibers, man-made cellulose fibers, or any combination thereof. Cellulose fibers include plant-based fibers, such as cotton fibers and bast fibers. Cellulose fibers also include pulp-based fibers, such as wood pulp fibers. Any natural cellulosic fiber may be used in the water-dispersible nonwoven substrate.

As used herein, the terms "percent by weight," "% by weight," and "wt. %" mean the weight of a pure substance divided by the total dry weight of a compound or composition, multiplied by 100. Typically, "weight" is measured in grams (g). For example, a composition with a total weight of 100 grams, which includes 25 grams of substance A, will include substance A in 25% by weight.

As used herein, the term "wipe" means a type of nonwoven article suitable for cleansing, disinfecting, applying a compound, removing a compound, or removing particles or other debris.

As used herein, the term "flushable" means the ability of a material, when flushed, to clear the toilet, drain lines, and screens leading to the municipal wastewater conveyance system.

As used herein, the terms "dispersible" and "water-dispersible" mean the ability of a material to readily break apart in water. In particular, the terms "dispersible" and "water-dispersible" mean the ability of a material to readily break apart due to the physical forces encountered during flushing in a common toilet, conveyance in a common wastewater system, and processing in a common treatment system.

As used herein, the term "basis weight" means the quantity by weight over a given area. The units of measure can be grams per square meter (gsm).

As used herein, the term "tensile strength" means the strength of the nonwoven substrate. Tensile strength can be measured in the cross machine direction (CD) or machine direction (MD) as specified. The units of tensile strength can be grams/inch (g/in).

As used herein, the term "plant-based fiber" means a fiber produced by and extracted from a plant as opposed to man-made fibers formed from regenerated cellulose.

As used herein, the term "nonwoven" means a web, fabric, or substrate having individual fibers which are randomly interlaid, but not in an identifiable manner as in the case of a knitted or woven fabric. Examples of nonwoven substrates include, but are not limited to, wet-laid webs and air-laid webs.

As used herein, the term "structured web" means a nonwoven fiber web having substantially filled protrusions and connecting regions disposed between the protrusions.

As used herein, the term "substantially filled" means that the protrusions are not hollow and can have variations in fiber density from protrusion to protrusion.

As used herein, the term "fiber density" means the amount of fibers per unit volume.

As used herein, the terms "perforations" or "perforated" when referring to a support surface means holes, voids, geometric shapes, or topological features on the surface. The perforations can be tapered. The perforations have any size, shape, diameter, or pattern.

The perforations can extend fully through or partially through the support surface. The perforated support surface can be any surface, including a belt or a drum.

As used herein, the term "multi-ply" means one or more plies or layers of a nonwoven substrate which are disposed upon one another, combined, joined, and/or adhered to one another with or without an adhesive. Multi-ply also means a multi-layer nonwoven substrate.

FIG. 1 illustrates an exemplary diagram of a structured web 100. The structured web 100 has a first surface 110 and a second surface 112. Protrusions 120 extend outwardly from the first surface 110. As shown in FIG. 1, the second surface 112 is substantially free of depressions. In another aspect, the portion of the second surface opposite the protrusions 120 can have depressions (not shown), but depressions are not required. If depressions are present, the depressions do not extend from the second surface 112 into the protrusions 120. The protrusions 120 are spaced apart at regular or irregular intervals by connecting regions 130. As described below, the surface protrusions 120 are created by either forming or entangling fibers on a perforated or textured support surface. Thus, the protrusions 120 are not created by embossing. Because the protrusions 120 and connecting regions 130 are formed by entangling the fibers on a perforated surface, the average fiber densities of the protrusions 120 and connecting regions 130 are substantially the same.

In another aspect, the nonwoven substrate described herein is water dispersible. Whether the nonwoven substrate is water-dispersible depends on the types of fibers, fiber lengths, basis weights, selected proportions, hydroentangling parameters, and other factors. Water-dispersible nonwoven substrates comprised of structured webs, multiple plies of structured webs, and multiple plies of webs of fibers are disclosed herein.

The nonwoven substrates can be a variety of products, including, but not limited to, a tissue, a wipe, or a portion of a cleaning tool or implement. The tissue can be a pre-moistened tissue. Further, the wipe can be a wet wipe, for example a personal care wet wipe comprising a wetting composition. The nonwoven substrate can have sufficient wet tensile strength for use as a pre-moistened tissue or wet wipe.

Despite the wet tensile strength, the nonwoven substrate can be water dispersible, or substantially disperse into smaller pieces and individual fibers in a relatively short time under immersion and mild agitation in water, such as being present in a standard septic tank or sanitary system. Because the nonwoven substrate includes individualized plant-based fibers, natural cellulosic fibers, pulp-based fibers regenerated cellulosic fibers, or any combination thereof, that can readily biodegrade, the nonwoven substrate can disperse in a septic tank or sanitary system, which prevents the tissue or wipe from clogging up sewage lines and screens at sewage treatment plants. Thus, the nonwoven substrate can be used for a variety of applications and then flushed down a toilet after a single use.

Plant-based fibers disclosed herein are substantially straight, plant-based fibers, which are individualized and substantially pectin-free. Conventional "individualized" fibers, such as individualized bast fibers, however, may be only subjected to mechanical individualization, not chemical individualization required to substantially remove pectin content. Enzymatic individualization is a non-limiting example of chemical individualization to provide substantially pectin-free fibers.

Individualized, plant-based fibers, such as flax or hemp, have several advantages for dispersible applications. Such fibers are natural; biodegradable; substantially cellulosic and absorbent for suitable wiping efficiency; substantially straight to increase fiber-to-fiber slippage and dispersion under agitation; available in lengths greater than 6 mm to provide higher strengths when hydroentangled, which is not possible with wood pulps; and irregular cross-section shapes which may facilitate wiping efficiency and strength.

Another advantage of the disclosed nonwoven substrates comprising structured webs of fibers is that the three-dimensional (3D) surface topography or texture increases the bulk, z-direction resilience, aesthetics, and wiping efficiency compared to flat substrates. Generally, consumers prefer surface texture and bulk over flat substrates. A multi-ply approach, also disclosed herein, can provide additional bulk, texture, more pronounced 3D embossing, and additional z-direction resilience, particularly if the plies are laminated with the projections face-to-face (structured surface-to-structured surface). In another aspect, the plies are combined with the projections facing away from one another. Yet, in another aspect, the plies are combined with the projections facing the same direction. The plies can be adhered to one another with or without an adhesive.

The fibers used in the nonwoven substrate can be individualized plant-based fibers. In one aspect, the fibers are substantially straight. In another aspect, the fibers are substantially pectin-free. A class of fibers which can be used are individualized bast fibers. Bast fibers are extracted from, but not limited to, flax, hemp, jute, ramie, nettle, Spanish broom, kenaf plants. The aforementioned individualized bast fibers can be employed in any combination.

Naturally occurring bundled bast fibers can be chemically treated to remove the pectin holding the bundles together and to separate the naturally occurring fibers into individual bast fibers. Pectin acts as natural glue which holds the individual bast fibers in the bundle. Naturally occurring bundled bast fibers can be first chemically treated to substantially remove pectin and form substantially pectin-free, individualized bast fibers which are substantially straight. After pectin removal from the bast fiber bundles, the fibers become individualized, which are smooth and elongated. In addition, individual bast fibers do not have kinks or crimps, and are non-fibrillated.

Enzymatic treatment is a non-limiting example of a chemical treatment that can be used to substantially remove pectin. PCT International Publication No. WO 2007/140578, which is incorporated herein in its entirety by reference, describes a pectin removal technology which produces individualized hemp and flax fiber for application in the woven textile industry. Although individualized bast fiber is straight, it has fineness similar to cotton and has a length of at least 20 mm, which can be cut to appropriate length for the process employed to form the nonwoven substrate. The process to remove pectin described in WO 2007/140578 can be employed.

The naturally occurring bundled bast fibers and the individualized bast fibers utilized in the present invention, in addition to visual and tactile inspection, can be distinguished by quantified measuring of the relative amounts of pectin present in the bundled versus the individualized bast fibers. A chemical test has been developed to make this relative quantification, which is based on the method described in WO 2007/140578. The test procedure is as follows:

Approximately 30 mg of fiber is exposed to 20 μL of Novozyme Pectinase from *Aspergillus niger* (50× dilution) in 800 μL of a 100 mM sodium citrate buffer that is adjusted to pH 4.5 with hydrochloric acid. The solution is heated to 40° C. for 1 hour. After heating, 50 μL of the liquid solution is removed and added to 1 mL of 10 mM sodium hydroxide. A 3.0 mL aliquot of a 0.5% solution of 4-hydroxy-benzhydrazide (prepared as a 5% solution in 0.5 M hydrochloric acid and diluted with 0.5 M sodium hydroxide to give a 0.5% solution) is added to the solution which is then heated in boiling water for 5 minutes. After cooling, the absorbance of the mixture is measured at 410 nm.

Standards of galacturonic acid are prepared in water, and 50 μL of these solutions are added to 1 mL aliquots of 10 mM sodium hydroxide. Colorimetric analysis of the reducing sugar is followed in the same manner as above.

Table 1 reports the results of the test in terms of the percentage of reduced sugar extracted from the fibers into an aqueous solution. The reduced sugar is pectin in its extracted form. Therefore, the relative fraction of reduced sugar in the aqueous solution correlates with the relative fraction of pectin attached to the bast fibers prior to the extraction test. As indicated in Table 1, individualized bast fibers after enzyme processing have less than 0.1% reduced sugar.

TABLE 1

| Relative reduced sugar/pectin content of bast fibers before and after enzymatic treatment Reduced Sugar Percentage (%)* | |
|---|---|
| Flax bast fiber bundles before enzyme processing | 1.1 |
| Individualized flax bast fibers after enzyme processing | Less Than 0.1 |

*Reduced sugar extraction is a proportional indicator for pectin content

Individualized bast fibers are typically straight and are substantially pectin free. For example, individualized bast fibers have less than 10% by weight of the pectin content of the naturally occurring fibers from which the substantially pectin-free fibers are derived. In another aspect, individualized bast fibers have less than 15% by weight of the pectin content of the naturally occurring fibers from which the substantially pectin-free fibers are derived. Still, in another aspect, individualized bast fibers have less than 20% by weight of the pectin content of the naturally occurring fibers from which the substantially pectin-free fibers are derived.

The regenerated cellulosic fibers of the nonwoven substrate can be crimped or straight man-made cellulosic fibers. Examples of regenerated cellulose include, but are not limited to, rayon, lyocell, (e.g., TENCEL), VISCOSE, or any combination thereof. TENCEL and VISCOSE are commercially available from Lenzing Aktiengesellschaft, Lenzing, Austria.

The regenerated cellulosic fibers can have any cross-sectional shape, such as flat or ribbon cross-sectional shapes. The regenerated cellulosic fibers can have non-round and/or irregular cross-sectional shapes. Irregular cross-sectional shapes affect various properties of the nonwoven substrate. For example, increasing surface area of the fibers can increase absorbance. The regenerated cellulosic fibers can have non-round cross-sectional shapes. The regenerated cellulosic fibers can have a flat cross-sectional shape or a ribbon cross-sectional shape. For example, VISCOSE fibers can be spun through spinning holes having any cross-section, such as a circular cross-section, a flat cross-section, or a multi-limbed cross-section. Non-limiting examples of non-round cross-sectional shapes include flat fibers, ribbon-shaped fibers, tri-lobal fibers, multi-lobal fibers, or any combination thereof. One example of a flat-shaped rayon fiber is VILOFT (2.4 decitex) (available from Kelheim Fibres, Kelheim, Germany).

In one aspect, the individualized plant-based fibers or regenerated cellulosic fibers disclosed herein have a mean length of at least 6 mm. In another aspect, the individualized plant-based fibers or regenerated cellulosic fibers have a mean length of at least 8 mm. Yet, in another aspect, the individualized plant-based fibers or regenerated cellulosic fibers have a mean length of at least 10 mm. Still yet, in another aspect, the individualized plant-based fibers or regenerated cellulosic fibers have a mean length of at least 12 mm. In one aspect, the individualized plant-based fibers or regenerated cellulosic fibers have a mean length of at least or in any range between about 6, 7, 8, 9, 10, 11, 12, 13, 14, 15, 16, 17, 18, 19, and 20 mm. In another aspect, the individualized plant-based fibers or regenerated cellulosic fibers have a mean length in a range between about 6 and about 8 mm; 6 and about 12 mm; or 14 and about 16 mm.

In addition to individualized plant-based fibers, regenerated cellulosic fibers, or natural cellulosic fibers the nonwoven substrates optionally include additional types of fibers. The wt. % of the individualized plant-based fibers, regenerated cellulosic fibers, or natural cellulosic fibers that are incorporated into the nonwoven substrate depends on the fiber length. In general, the longer the fiber length, the lower wt. % that can be utilized to obtain sufficient mechanical properties. In one aspect, the plant-based fibers, regenerated cellulosic fibers, or natural cellulosic fibers are present in the nonwoven substrate in an amount in a range between about 15 and about 25 wt. % based on the total weight of the nonwoven substrate. In another aspect, the plant-based fibers, regenerated cellulosic fibers, or natural cellulosic fibers are present in the nonwoven substrate in an amount in a range between about 10 and about 15 wt. % based on the total weight of the nonwoven substrate. Yet, in another aspect, the plant-based fibers, regenerated cellulosic fibers, or natural cellulosic fibers are present in the nonwoven substrate in an amount of at least 30 wt. % based on the total weight of the nonwoven substrate. Still yet, in another aspect, the plant-based fibers, regenerated cellulosic fibers, or natural cellulosic fibers are present in the nonwoven substrate in an amount about or in any range between about 5, 7, 10, 12, 15, 17, 20, 22, 25, 27, 30, 32, 35, 37, 40, 42, 45, 47, 50, 52, 55, 57, 60, 62, 65, 67, 70, 72, 75, 77, 80, 82, 85, 87, 90, 92, 95, 97, and 100 wt. % based on the total weight of the nonwoven substrate.

In addition to plant-based fibers, regenerated cellulosic fibers, the nonwoven substrate can include wood pulp fibers. Examples of wood pulp fibers include, but are not limited to, commercially available bright fluff pulp fibers, such as southern softwood fluff pulp fibers, northern softwood sulfite pulp fibers, or hardwood pulp fibers (e.g., eucalyptus).

The nonwoven substrate can include crimped or straight staple fibers derived from one or more source. Staple fibers include, but are not limited to, cellulosic fibers (both natural and man-made) and thermoplastic fibers. An example of a cellulosic staple fiber comprises rayon. Thermoplastic fibers include the conventional polymeric fibers utilized in the nonwoven industry. Such fibers are formed from polymers which include, but are not limited to, a polyester such as polyethylene terephthalate; a nylon; a polyamide; a polyolefin such as polypropylene or polyethylene; a blend of two or more of a polyester, a nylon, a polyamide, or a polyolefin; a bi-component composite of any two of a polyester, a nylon, a polyamide, or a polyolefin; and the like. An example of a bi-component composite fiber includes, but is not limited to, a fiber having a core of one polymer and a sheath comprising a polymer different from the core polymer which completely, substantially, or partially encloses the core. Polyvinyl alcohol fibers can be used.

The fiber diameters of the individualized plant-based fibers and regenerated cellulosic fibers depend on the desired properties of the finished material. Generally, smaller fiber diameters provide softer substrates, better material coverage, and uniformity. Generally, the larger the fiber diameter, the stiffer the fiber, which results in decreased ability to hydroentangle. The fiber diameter of the wood pulp fibers depends on the source and nature of the pulp (e.g., hardwood versus softwood, northern versus southern, etc.) Likewise, the fiber diameter of the individualized plant-based fibers and regenerated cellulosic fibers depends on the source and nature of the fibers. Regenerated cellulose fibers can be produced in a broad range of fiber diameters. Rayon and TENCEL fibers are commercially available in the 1.3-3.3 decitex range from Lenzing Aktiengesellschaft.

The regenerated cellulosic fibers can have non-round and/or irregular cross-sectional shapes. Irregular cross-sectional shapes affect various properties of the nonwoven substrate. For example, increasing surface area of the fibers can increase absorbance. The regenerated cellulosic fibers can have non-round cross-sectional shapes. For example, the regenerated cellulosic fibers can have a flat cross-sectional shape or a ribbon cross-sectional shape.

The individualized plant-based fibers and/or regenerated cellulosic fibers are optionally combined with any additional fibers, such as wood pulp fibers and/or other fibers, in the desired proportions and formed into a fiber web. The fiber web can be a structured web or a non-structured web. Any web-forming method known in the art can be used, including wet-laid (wet laying) or air-laid (air laying, dry laying, or dry laid) methods. Then the fibers of the web are entangled, for example by hydroentangling. Hydroentangling parameters depend on the desired material properties, fiber selection, machine speeds, equipment design, etc. Fiber composition ranges, fiber lengths, and other characteristics are dependent on the desired process parameters and material properties.

Wet-laid and air-laid web forming methods and entangling (e.g., hydroentangling) methods are known in the art and can be used to form a fiber web. One or more layers or plies of the substantially flat (unstructured) webs can be combined, disposed upon on another, and/or adhered together to form a multi-ply nonwoven substrate.

A structured web can be created by initially forming the web (e.g., by wet-laid or air-laid methods) and/or entangling into a perforated/textured belt or other surface. One or more plies can be formed and then combined to form a multi-ply nonwoven substrate. In one aspect, a structured web is combined with another fiber web (structured or non-structured) to form the multi-ply nonwoven substrate. Non-structured webs are formed and entangled by methods known in the art, including wet-laid methods, air-laid methods, and hydroentangling methods. It is noted that the forming surface have some perforations for water flow through and vacuum suction.

To create a structured web, fibers are molded into the holes of a perforated surface, such as a perforated belt, during the web forming process or as part of the entangling (e.g., hydroentangling) process. After hydroentangling and removing the web from the belt, resilient surface projections/protrusions are created in the structured web. The perforated belt or surface should be selected and designed to provide for uniform fiber formation, desired surface projection appearance and aesthetics, suitable air or water management during formation, proficient hydroentangling, acceptable web release, and other functional characteristics.

Although a single ply or layer of the nonwoven substrate would be suitable for many applications, the use of multiple plies can be advantageous for functional or aesthetic reasons. Multi-ply nonwoven substrates are common in the premium bath tissue market. For instance, instead of a single ply of material with a basis weight of 60 gsm, the material can be comprised of two plies, each with a basis weight of 30 gsm, or three plies, each with a basis weight of 20 gsm. Multiple plies can enhance the pattern definition, bulk, softness, and fluid handling characteristics as compared to a single ply nonwoven substrate. Multi-ply water dispersible products can be produced by combining the disclosed structured webs and/or non-structured webs.

The total basis weight of the nonwoven substrate, which can include a single ply or multiple plies in the final tissue or wet wipe product, is in the range between about 20 gsm and about 100 gsm. In one aspect, a single ply of the nonwoven substrate has a basis weight in a range between about 40 and about 100 gsm. In another aspect, a single ply of the nonwoven substrate has a basis weight in a range between about 50 and about 90 gsm. Yet, in another aspect, a single ply of the nonwoven substrate has a basis weight in a range between about 60 and about 80 gsm. Still, in another aspect, a single ply of the nonwoven substrate has a basis weight about or in any range between about 20, 25, 30, 35, 40, 45, 50, 55, 60, 65, 70, 75, 80, 85, 90, 95, and 100 gsm. Single plies of any basis weight can be combined with another ply to provide a multi-ply nonwoven substrate. For example, two or three plies can be combined to form a two-ply or three-ply, respectively, nonwoven substrate. Structured webs and or non-structured webs can be combined in any basis weight or fiber composition combination to provide the desired multi-ply substrate. For example, two or more structured webs can be combined/joined. Two or more un-structured webs can be combined/joined. One or more structured webs can be combined with one or more un-structured webs.

Joining of multiple plies is well-known in the art, and there are many suitable techniques. However, because the nonwoven substrate includes materials that are water-dispersible, care must be taken in selecting a ply-joining technique which does not interfere with water-dispersibility and adds the aesthetic and functional benefits important to users of the product.

The multi-ply substrate described herein is made by methods that are different than methods employing multiple production heads frequently used in carding, spunbonding, and other nonwoven processes where the primary goal is to increase machine output. In processes employing multiple production heads, the multiple layers deposited onto the forming wire are generally indistinguishable to the end-user and appear as a single layer.

In contrast, the inventive multi-ply substrate described herein includes plies that are produced individually (separately) on different forming apparatuses. The inventive multi-ply substrates also are laminated in such a way as to provide various physical properties. For example, the plies are laminated (or joined) to increase fabric bulk, add an aesthetically pleasing pattern, add surface topography, increase the fluid retaining capacity, or other benefits, while simultaneously preserving dispersibility. Furthermore, the inventive multi-ply substrate includes spaces between the plies, which contribute to the improved functionality.

Joining of the individual plies of the multi-ply substrate also can be optimized to provide improved water-dispersibilty compared to a single ply substrate having substantially the same total basis weight. For example, two 25-gsm plies may be optimally joined to be more water-dispersible than a single 50-gsm layer of the same material.

The plies can be produced separately and then wound onto rolls. The plies can then be unwound in a separate process and joined together. At this point, the multi-ply sheets can be wound onto a roll. Alternatively, the multi-ply sheets can continue onto a further converting step, such as wet wipe converting where they are folded, perforated, cut, and placed into a package with a wetting solution.

The plies can be adhered to one another by any suitable method, including mechanical and chemical methods. U.S. Patent Publication No. 2009/0311481, which is incorporated herein in its entirety by reference, describes examples of methods to adhere plies to one another. Suitable non-limiting mechanical methods to adhere the plies to one another include hydroentangling, knurling, ultrasonic, pattern embossing, folding, needling, and perforated embossing.

In hydroentangling, high pressure water jets can be used in a pattern form to entangle the plies together when disposed upon one another. After hydroentangling, the plies can still separate under agitation in the sewer system.

The knurling process refers to a ply bonding device including of a wheel with knurled surface cooperating with a counter roller with smooth hardened surface. The web passes between the wheel and counter roller where plies are bonded by localized pressure between the protruding elements of the wheel and the counter roller. The knurled surface is a series of projecting knobs, ridges, or spicules. A knurling process is described in U.S. Pat. No. 5,433,817, which is incorporated herein in its entirety by reference.

Ultrasonic refers to the use of a high frequency sound pressure wave as the actuator of a patterned surface. As the web passes between the pattern and smooth surface, the bond is formed by the localized pressure developed between the patterned surface and a cooperating smooth surface. The high frequency pressure wave is the actuator driving the patterned surface against the smooth surface.

Pattern embossing refers to a pair of rollers, each with a patterned surface, that allows rolls to be engaged and in synchronous rotation. The bond is formed as the web passes between the patterned rollers. A pattern embossing process is described in U.S. Pat. No. 5,158,523, which is incorporated herein in its entirety by reference.

Folding refers to the bending of web onto itself (e.g., any multi-folded napkin or towel). The bond, or locking or adhering of plies, is developed by the nature of the fold.

Needling refers to a process where needles are inserted into a web. The bond is formed by the increased friction of the entangled fibers between the plies at the point where the barbed needles pass in and out of the web.

Perforated embossing refers to a process where a patterned emboss roll working in cooperation with an equivalent patterned roll result in very small fractures of the web. The web passes through the nip formed by the two pattern rolls which are engaged and synchronous. The proximity of the mating embossing elements results in small cuts or tears of the web. A perforated embossing process is described in U.S. Pat. No. 8,178,025, which is incorporated herein in its entirety by reference.

Use of ply adhesive is another technique for joining the webs. Any suitable adhesive can be employed or disposed between plies to attach or adhere the multiple plies together, provided the adhesive joins the plies sufficiently for product converting, shelf-life, and consumer use, but does not impede the breakup of the material in the sewer system (if a water dispersible substrate is desired). One non-limiting example of a suitable adhesive class is polyvinyl alcohol (PVOH). PVOH is commercially available as SELVOL from Sekisui Specialty Chemicals America LLC (Dallas, Tex.) in fully, super, and intermediate hydrolyzed versions as grades 125, 165, 325, 325, 350 and 425. Generally, the higher the degree of hydrolysis, the greater the water resistance of the dried adhesive film. Further, the greater the viscosity (or molecular weight) of the PVOH, the stronger the bond that forms between the PVOH film and the substrate. Thus, the particular PVOH can be selected and tailored depending on the desired product. Other commercial PVOH suppliers include, but are not limited to, DuPont Chemical Company, Wilmington, Del. (ELVANOL); Kuraray Company, Tokyo, Japan (POVAL and MOWIOL); and NIPPON GOHSEI, Dusseldorf, Germany (GOHSENOL).

PVOH can be cross-linked to increase its performance. Suitable PVOH cross-linkers include, but are not limited to, aldehydes (e.g., glyoxal, gluteraldehyde, hydroxyadipaldehyde), thermosetting polymers (e.g., urea-formaldehyde and melamine formaldehyde resins), and salts of multi-valent anions, such as zirconium carbonate. ZIRMEL 1000 (commercially available from MEL Chemicals, Inc., Flemington, N.J.), which is based-on potassium zirconium carbonate, and other cross-linkers effectively insolubilize PVOH coatings. Such cross-linkers react upon drying, providing excellent wet-rub and wet-pick properties with a variety of binder systems. Other suitable non-limiting suppliers of suitable cross-linking agents are MEL Chemicals, Inc. (BACOTE 20); Bercen, Inc., Denham Springs, La. (BERSET 2720); and Ashland, Inc., Covington, Ky. (POLYCUP 172), among others.

Another suitable adhesive class is the ion-triggerable water dispersible cationic polymers. A non-limiting example of an ion-triggerable water dispersible cationic polymer is disclosed in U.S. Pat. No. 6,994,865 at column 6, line 10 through column 7, line 62, which is incorporated herein in its entirety by reference.

When used, the adhesive can be applied to a surface of the nonwoven substrate by any suitable technique known in the art, for example, spraying, printing, die extrusion, roll coating, curtain coating, or any combination thereof. The adhesive add-on depends on the specific chemistry used, the application technique, ply strength desired, and other factors. For example, the first ply can be adhered to a second ply by applying an adhesive to the first play, e.g., by printing, and then disposing the second ply onto the first ply. Any number of additional plies can be added as desired.

In one aspect, one or more plies of the nonwoven substrate are adhered to one another without an adhesive. The surface tension in the wetting composition is sufficient to hold the plies together. The wetting composition's viscosity can be increased to promote surface tension adhesion, for example by adding glycerol or another viscous compound to the wetting composition.

Ply strengths can be measured using dry layers or modified for wet layers with a controlled degree of wetness addition. Ply bond strengths can be determined from the average load required to separate the plies of a two-ply tissue, towel, napkin, wet wipe, or facial finished product using a TMI Ply Bond Lab Master Slip & Friction tester Model 32-90, with a high-sensitivity load measuring option and custom planar top without an elevator, available from Testing Machines, Inc. (South Islandia, N.Y.). Ply Bond clamps are available from Research Dimensions (Neenah, Wis.).

Samples are preconditioned according to Technical Association of the Pulp and Paper Industry (TAPPI) standards and handled only by the edges and corners, exercising care to minimize touching the area of the sample to be tested. At least ten sheets following the tail seal are discarded. Four samples are cut from the roll thereafter, each having a length equivalent to 2 sheets, but the cuts are made ¼ inch away from the perforation lines by making a first cross-direction (CD) cut ¼ inch before a first perforation and a second CD cut ¼ inch before the third perforation so that the second perforation remains roughly centered in the sheet. The plies of each specimen are initially separated in the leading edge area before the first perforation continuing to approximately 2 inches past this perforation. The sample is positioned so that the interior ply faces upwardly. The separated portion of the ply is folded back to a location ½ inch from the initial cut and ¼ inch from the first perforation and creased. The folded back portion of the top ply is secured in one clamp so that the line contact of the top grip is on the perforation, and the clamp is placed back onto the load cell. The exterior ply of the samples is secured to the platform, aligning the perforation with the line contact of the grip and centering it with the clamp edges. After ensuring the sample is aligned with the clamps and perforations, the load-measuring arm is slowly moved to the left at a speed of 25.4 centimeters/minute, and the average load on the arm (inches/gram) is measured and recorded. The average of three samples is recorded. The fourth sample is reserved for use in the event that one of the first three samples is damaged.

The thickness of the nonwoven substrate depends on many factors, including basis weights, fiber composition, hydroentangling parameters, perforated belt parameters, and desired characteristics. For total basis weights (whether single or multi-ply) in a range between about 60 and about 80 gsm, dry thicknesses using Association of the Nonwoven Fabrics Industry (INDA) method (0.5 kPA pressure) is in a range between about 0.5 and about 1.0 mm. In another aspect, the thickness of the nonwoven substrate is in a range between about 0.6 and about 0.9 mm. Yet, in another aspect, the thickness of the nonwoven substrate is in a range between about 0.7 and about 0.8 mm. The thickness of the nonwoven substrate, however, is not intended to be limited and depends on the desired application.

Figure 2:
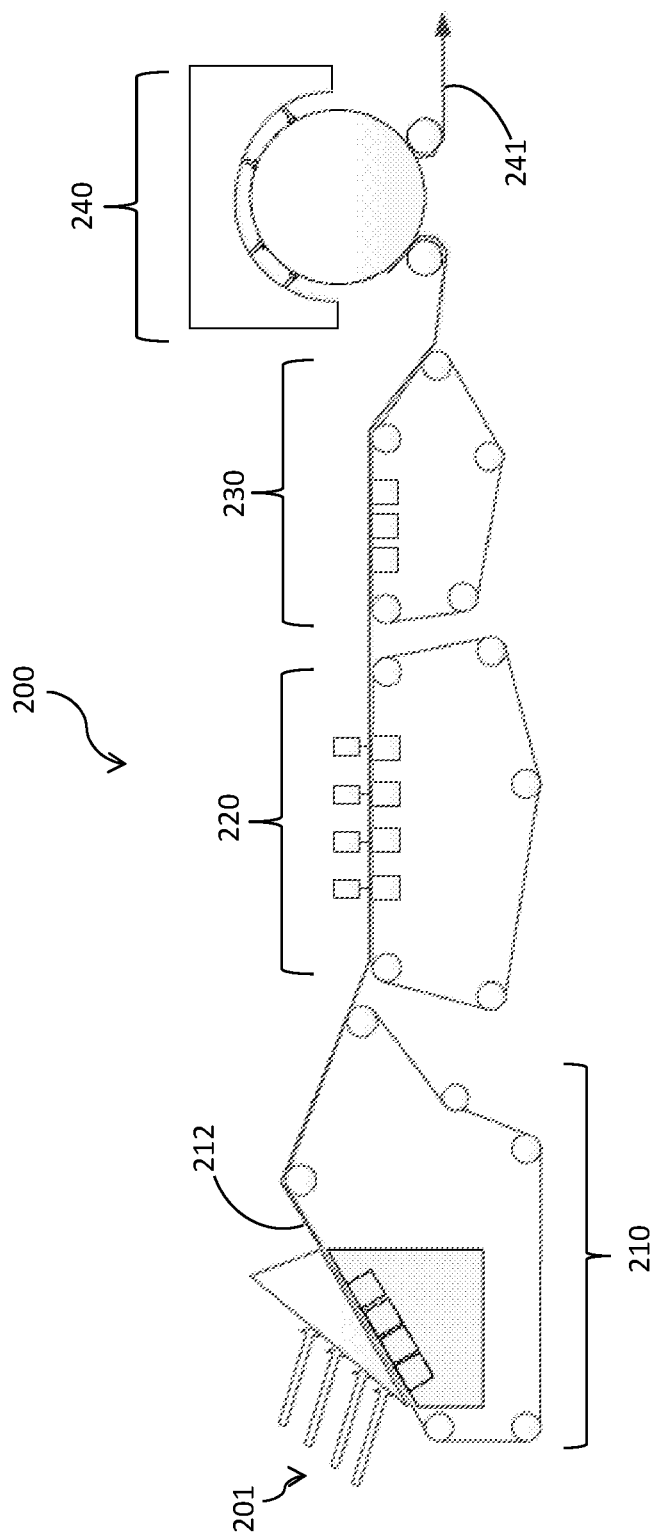
FIG. 2 illustrates an exemplary incline wire wet-laid method of making the nonwoven substrate.

Any wet-laid method known in the art can be used to form an initial fiber web. FIG. 2 illustrates an exemplary method 200 of making the nonwoven substrate using an incline wire wet-laid approach. Method 200 can be used to make both structured webs and non-structured webs. Fibers are suspended in an aqueous suspension, including any desired additives, to provide a diluted fiber suspension 201. The diluted fiber suspension 201 is fed onto an upwardly inclined moving wire screen 212 in the web forming area 210. Water from the dilute fiber suspension falls freely and rapidly through the screen, leaving the fibers deposited on the screen 212 and forming a wet fiber web. The fibers are then hydroentangled 220 (described in detail below), dewatered 230, and dried, for example with a through-air dryer (TAD) 240, to provide the nonwoven substrate 241. The web can be either formed on or hydroentangled on a perforated belt/surface to provide a structured web. For example, wire screen 212 can be a perforated belt. When the web is formed on a conventional wire screen 212 and hydroentangled on a conventional flat or substantially planar/flat surface, then the web is a non-structured (unstructured) web.

Figure 3:
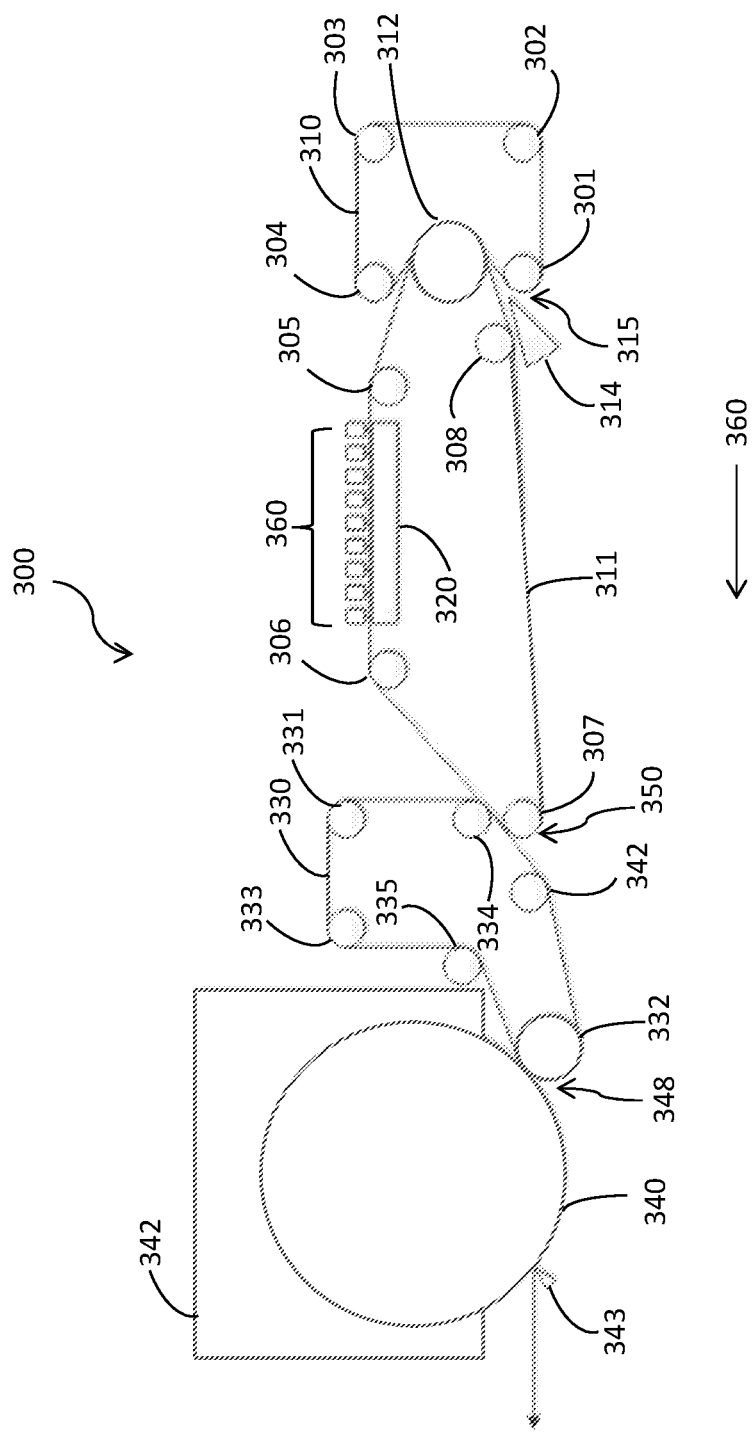
FIG. 3 illustrates an exemplary twin wire wet-laid method of making the nonwoven substrate.

FIG. 3 illustrates another wet laying method 300 which uses a twin wire forming section. Method 300 can be used to make both structured and non-structured (unstructured) webs. A pair of forming wires, outer wire 310 and inner wire or perforated/patterned belt 311, is supported by a plurality of rolls, 301, 302, 303, 304, 305, 306, 307, and 308, and forming roll 312. A dilute fiber slurry is discharged from headbox 314 in the machine direction to a nip 315 between forming roll 312 and roll 301. Optionally, dispersion aids (chemical and mechanical) can be implemented before the headbox 314. For example, the fibers can be mixed with chemical dispersion aids, or the fibers can be subjected to mechanical dispersion to promote dispersing fibers. The nascent web (not shown) follows a curvilinear path on the inner wire or perforated/patterned belt 311 defined by the forming roll 312 and may dewatered with the assistance of suction, for example by way of a vacuum section in forming roll 312, vacuum suction box 320, or other vacuum device. The nascent web can be hydroentangled on the inner wire or perforated/patterned belt 311 by passing under a plurality of hydroentangling units 360. The web is further dewatered as it enters nip 350 and advances to felt 330, which is supported on a plurality of rolls 331, 333, 334, 335, 342 and a pressure roll 332. The web continues to advance in the machine direction (MD) 360 where it is wet-pressed onto Yankee cylinder 340 in transfer nip 348. Adhesives can be used to adhere the web to the Yankee dryer. The web is dried on the Yankee cylinder 340, which is a heated cylinder, and by a high jet velocity impingement air in Yankee hood 341. Optionally, doctor blade 343 can be used for creping the dried web from the Yankee cylinder 340. Although, the web can be un-creped. When the web is formed and hydroentangled on a conventional wire, a non-structured (unstructured) web is formed. When the web is formed and/or hydroentangled on a perforated surface, a structured nonwoven substrate is formed.

In the above wet-laid methods described, the fiber web can foam-formed in the presence of a dispersion agent, which is similar to wet-laid methods. During foam-forming the fibers are dispersed in a foamed liquid containing a foam-forming surfactant and water. Then the fiber dispersion is dewatered on a support wire or mesh, like in wet-laying. The dispersion agent can either be directly added to the fibers in the form of a "fiber finish," or it can be added to the water system in the wet-laying or foam-forming process. The addition of a suitable dispersion agent assists in providing good formation, i.e., substantially uniform fiber dispersion, of the fibers. The dispersion agent can be of many different types, which provides a suitable dispersion effect on the fiber mixture. A non-limiting example of a dispersion agent is a mixture of 75% bis(hydrogenated tallowalkyl)dimethyl ammonium chloride and 25% propylene glycol. Additional non-limiting dispersion aids and methods suitable for wet-laying fibers are disclosed in U.S. Pat. Nos. 4,822,452; 4,925,528; and 5,238,534, each of which are incorporated herein in their entirety by reference.

In addition to wet-laying and foam-forming methods, webs can be formed by air-laying (also called air-laid processes, air-forming processes, or dry laid processes). Air-laid processes are described in PCT International Publication No. WO 03/099886 and U.S. Pat. Nos. 4,014,635 and 4,640,810, all of which are respectively incorporated herein in their entirety by reference. In air laying methods, air flow, gravity, and centrifugal force are used to deposit a stream of fibers onto a moving forming wire. The fibers are blended to a homogeneous mixture, supported in an air stream, and transported via the air stream to a distributor unit. The distributor unit contains a rotating cylinder or drum that is perforated with holes, slots or other appropriately shaped apertures designed to allow passage of the fibers onto a foraminous carrier surface. When the surface is a conventional foraminous wire surface, the web will be a non-structured web. A perforated belt or other surface can be used instead of the conventional wire to provide the structured web. The construction of the drum and configuration and size of the apertures can be varied according to the characteristics of the fiber mixture to be employed and to obtain unique web construction. Under the influence of a combination of any of air flow, mechanical agitation within the drum, and suction from beneath the carrier, the fibers are directed through the openings of the perforated drum and form a homogeneous web on the surface of the carrier. The height and degree of matting of the dry web can be varied by controlling the process variables, including fiber content and size, drum aperture size and shape, rate of air flow, degree of suction applied from the bottom of the carrier, and carrier speed. Other equipment controls may also be varied to provide unique matting construction.

Figure 4:
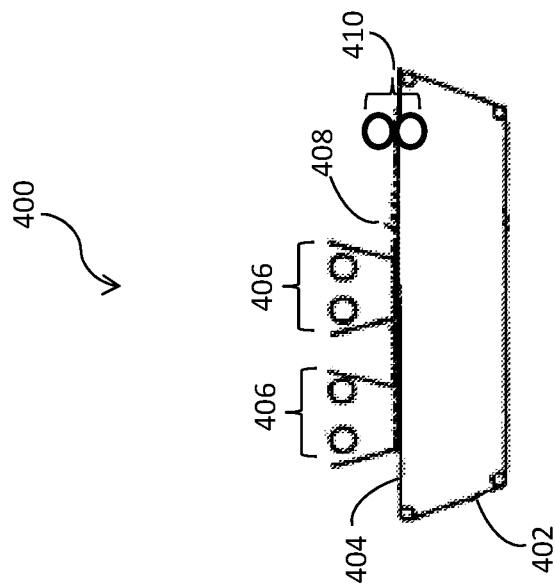
FIG. 4 illustrates an exemplary air-laid method of making the nonwoven substrate.

FIG. 4 is exemplary air-laid method 400 of forming a nonwoven substrate. Air-laid method 400 can be used to make a structured web or a non-structured web. A wire screen 402 has a moving belt 404 positioned below a pair of distributor heads 406 that dispose the fiber mixture to the moving belt 404. After being deposited/disposed onto the moving belt, a loosely-formed web 408 results. The loosely-formed web 408 travels along the moving belt 404 and is compressed between rollers 410. The moving belt 404 can be a perforated belt or other support surface to provide a structured web. The moving belt 404 can be a conventional belt or substantially planar surface to provide a fiber web without structure (non-structured or unstructured web).

The formed wet-laid or air-laid (dry-laid) webs can directly and continuously transported to an entanglement unit, for example a hydroentanglement unit or spunlacing unit. Hydroentangling can be patterned hydroentangling. Non-limiting examples of the hydroentangling process are described in Canadian Patent No. 841,938 and U.S. Pat. Nos. 3,485,706 and 5,958,186. U.S. Pat. Nos. 3,485,706 and 5,958,186, respectively, are incorporated herein in their entirety by reference. Suitable hydrogentangling equipment is commercially available from ANDRITZ Perfojet SAS (Montbonnot, France) and Trützschler (Moenchengladbach Germany). The webs are struck with a series of high pressure water jets to mechanically entangle or consolidate the fibers and form the nonwoven substrate. The jets can be oriented perpendicular to the surface of the carrier surface or angled to provide unique properties to the web. Jets can be placed to consolidate the web from one side, for example, the top side or from both the top and bottom side. Hydroentangling of the fibers provides distinct hydroemboss patterns, which can create low fiber count zones, facilitate water dispersion, and provide a three dimensional structure.

During hydroentangling, the drape and softness of the nonwoven substrate can be controlled by the energy delivered by the high pressure jets and by the speed of web's travel of through the equipment. By controlling the water pressure and web travel speed through the spunlacing equipment, as well as the type and amount of adhesives, binders, and bonding fibers, a nonwoven substrate having varying degrees of strength, absorbency, softness, and thickness can be obtained.

Multiple air-laid and/or wet-laid webs (plies or layers) may be prepared and stacked prior to hydroentangling to obtain thicker nonwoven substrates. The respective stacked layers can include the same fiber composition. Alternatively, the respective stacked layers can have differing compositions and/or basis weights, which are selected for the intended end use of the nonwoven substrate. Entanglement can be achieved by varying the water jet pressure and the web's travel speed through the spunlacing unit.

Following the entangling, the wet nonwoven web can be dried and wound for transport and storage. The web can be dried by any suitable method, including, but not limited to, drying on a Yankee dryer, TAD, air-drying, or any combination thereof. The ready material is then converted in any known way to a suitable format and then packed. Prior to drying, the entangled web can be embossed either by a hydroembossing process or by thermal embossing.

To provide structure, topography, or surface texture to the nonwoven substrate, hydoentangling or initial web forming can be performed on a surface or support member with any desired structural topography. A suitable perforated support structure is disclosed in U.S. Patent Pub. No. 2012/0021171. For example, the nonwoven substrate can be formed or hydroentangled on a perforated belt (see FIG. 5) or a rotatable drum (see FIG. 6). The support member aids in imparting desired texture, softness, and bulk to the nonwoven substrates produced thereon. The belt or sleeve has two sides: a web/substrate/sheet receiving or contacting side and a machine contacting or back side. The web contacting side faces the nonwoven substrate web. The machine side of the support member passes over and is in contact with rolls or cylinder on the machine.

The web contacting side includes a plurality of perforations, holes, voids, geometric shapes, or topological features. The perforations can be tapered. The perforations, holes, or voids can pass entirely through the support member, or the perforations can extend partially through the support member. The perforations or holes provide the nonwoven substrate with enhanced topography and bulk, or structure. Another advantage of using a perforated support surface is that web release is easier from the surface.

When the perforated surface is a belt, the belt can have any desired thickness, for example in a range between about 0.2 and about 1.5 mm. The perforations are separated by a plurality of flat portions, or lands therebetween. The perforations can have any shape or size, which depends on the desired topography of the nonwoven substrate. The perforations can be, for example, circle-shaped or oval-shaped. The perforations can have any diameter. Non-limiting examples of suitable diameters for the perforations are in a range between about 0.1 mm and about 10 mm. In one aspect, the perforations have a diameter in a range between about 1.0 and about 2.0 mm. The shapes and sizes of the perforations through the belt can be varied to achieve particular desired structures in the final product. The belt perforations can be manufactured in any overall pattern or hole-to-hole spacing. In addition, the belt can include multiple layers.

The support surface, whether it is a belt, drum, or sleeve, can be formed by cutting or engraving a pattern, e.g., a honeycomb structure. The support surface can be treated with a chemical coating for a specific application, such as static dissipation, contamination/soil release, durability improvement, etc. The use of the support member provides for greater energy reflection compared to a standard flat, woven belt. Thus, fiber entangling is improved. Also fiber penetration into the support belt apertures/holes/voids is prevented, which can lead to fiber loss or difficulty in releasing the nonwoven cleanly and uniformly from the support belt/sleeve, as may be observed in woven belts or support members. In such woven belts or support members, fibers can be trapped in the knuckles of the fabric where the woven filaments intersect one other.

Fibers can be molded or pulled using a vacuum into the perforations/holes of the forming/hydroentangling support surface. When the web is hydroentangled on the perforated surface in a molded state, the fibers are permanently set in the shape of the perforations. The surface/belt design depends on the desired final material topography.

By using a perforated belt process, a structured web can be made which is a variable basis weight product that exhibits, among other properties, caliper or bulk. The structured web has a repeating structure of protrusions on one side. The opposing side can also include protrusions.

Figure 5:
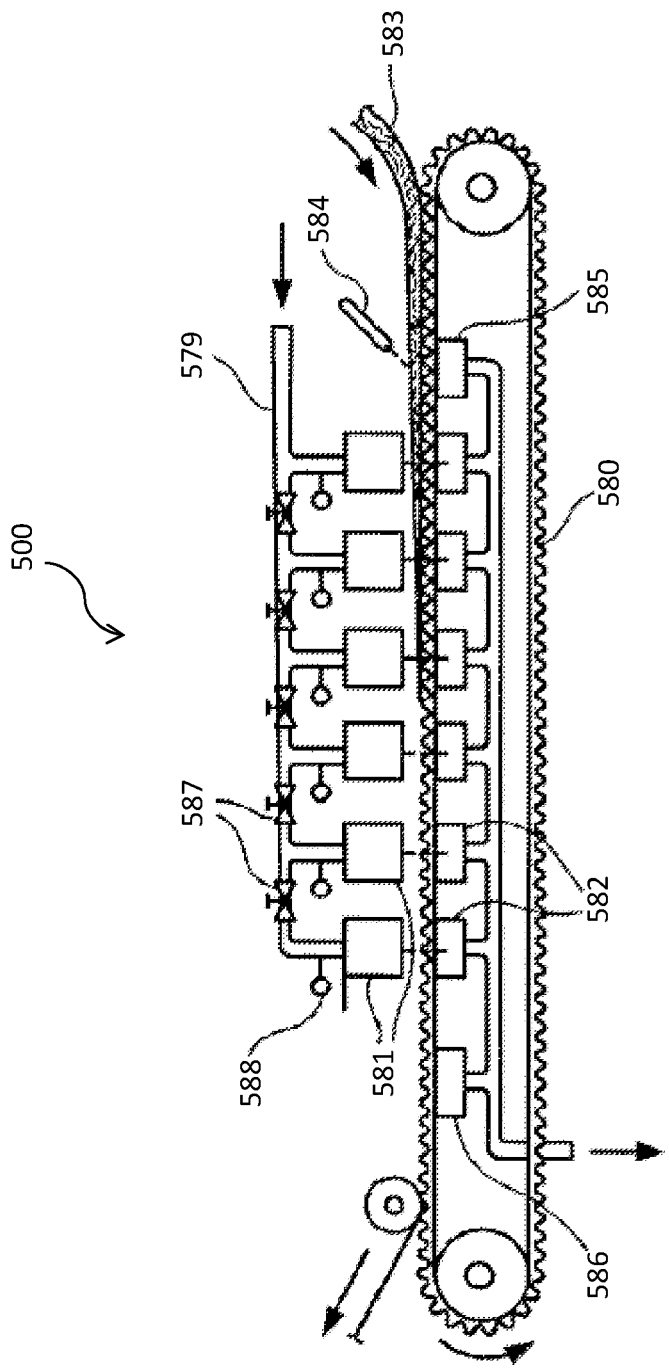
FIG. 5 illustrates an exemplary perforated belt method for making a structured web.

FIG. 5 depicts an exemplary method 500 for continuously producing structured webs using a perforated belt support member. A perforated conveyor belt 580 serves as the topographical support member and is continuously moved in a counterclockwise direction (as shown in FIG. 5) or in a clockwise direction (not shown), for example, about a pair of spaced-apart rollers as is well known in the art. Disposed above the perforated conveyor belt 580 is a fluid ejecting manifold 579 connecting a plurality of lines or groups 581 of orifices. Each group 581 has one or more rows, for example from one to three rows, of fine diameter orifices. The diameters of orifices generally vary but can be, for example, in a range between about 0.18 and about 0.18 mm. The center spacing between the orifices can be, for example, in a range of about 0.4 to about 0.6 mm. In one aspect, the diameter of the fine diameter orifices is about 0.007 inch, with about 30 such orifices per inch. Water is supplied to the groups 581 of orifices under a predetermined pressure, which generally varies, and is ejected from the orifices in the form of very fine, substantially columnar, non-diverging streams or jets of water. The manifold 579 is equipped with pressure gauges 588 and control valves 587 for regulating the fluid pressure in each line or group of orifices. Disposed beneath each orifice line or group is a suction box 582 for removing excess water and to keep the area from undue flooding. The fiber web 583 to be formed into the structured nonwoven substrate is fed to the topographical support member conveyor belt 580. Water is sprayed through an appropriate nozzle 584 onto the fibrous web to pre-wet the incoming web 583 and aid in controlling the fibers as they pass under the fluid ejecting manifold 579. A suction slot 585 is placed beneath this water nozzle 584 to remove excess water. The fibrous web 583 passes under the fluid ejecting manifold 579 in a counterclockwise direction. The pressure at which any given group 581 of orifices is operated can be set independently from the pressure at which any of the other groups 581 of orifices is operated. However, the group 581 of orifices nearest spray nozzle 584 can be operated at a relatively low pressure, e.g. in a range between about 200 and about 2,000 psi, depending on the degree of entanglement needed, the machine speed, the fiber used, and the fabric basis weights. The pressures are usually ramped up sequentially from nozzle to nozzle. In one aspect, the spray nozzle 584 is operated at a pressure of about 1,000 psi. Such pressure assists in settling the incoming web onto the surface of the support member. As the web 583 passes in the counterclockwise direction, the pressures at which the groups 581 of orifices are operated are usually increased. Generally, each succeeding group 581 of orifices does not need to be operated at a pressure higher than its neighbor in the clockwise direction. For example, two or more adjacent groups 581 of orifices can be operated at the same pressure, after which the next succeeding group 581 of orifices (in the counterclockwise direction) can be operated at a different pressure. The operating pressures at the end of the perforated conveyor belt 580 where the web 583 is removed are higher than the operating pressures where the web 583 is initially fed into the perforated conveyor belt 480. Though six groups 581 of orifices are shown in FIG. 5, the number of orifices will generally vary and depends on many factors, including the weight of the web, the speed, the pressures used, the number of rows of holes in each group, etc. After passing between the fluid ejecting manifold 579 and the suction box 582, the formed nonwoven substrate is passed over an additional suction slot 586 to remove excess water. The distance from the lower surfaces of the groups 581 of orifices to the upper surface of fibrous web 583 varies, for example from about 0.5 inch to about 2.0 inches, or in a range from about 0.75 inch to about 1.0 inch. It will be apparent that the web cannot be spaced so closely to the fluid ejecting manifold 579 that the web 583 contacts the fluid ejecting manifold 579. On the other hand, if the distance between the lower surfaces of the orifices and the upper surface of the web 583 is too great, the fluid streams will lose energy and the process will be less efficient.

Figure 6:
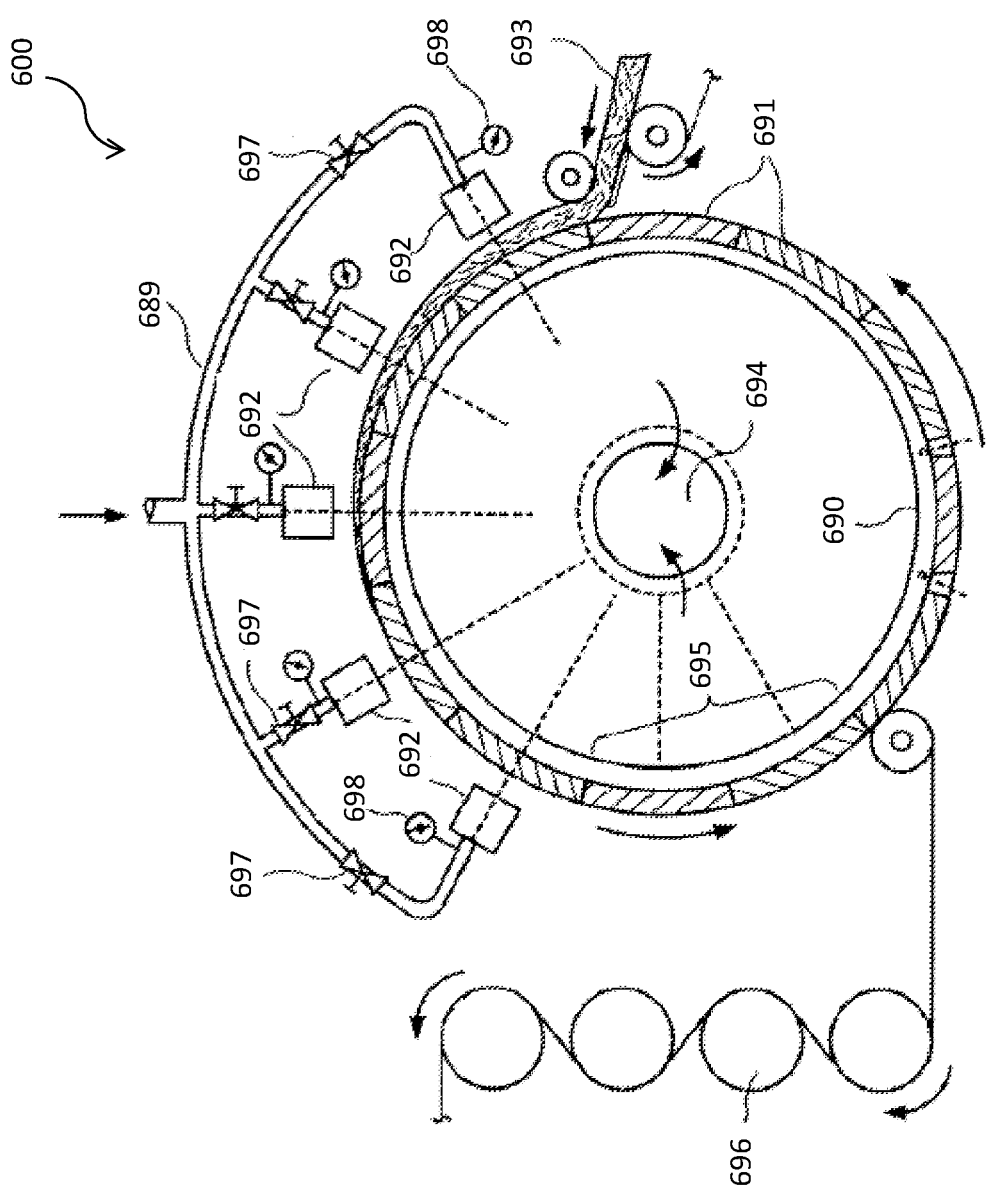
FIG. 6 illustrates an exemplary rotatable drum sleeve method for making a structured web.

FIG. 6 illustrates another exemplary method 600 for producing the structured web using another topological support member, a rotatable drum sleeve 691. The drum 690 under the drum sleeve 691 rotates in a counterclockwise direction, for example. In another aspect, the drum 690 rotates in a clockwise direction. The outer surface of the drum sleeve 691 comprises the desired topographical support configuration, or a series of perforations or holes, as discussed above for FIG. 5. A manifold 689 is disposed about a portion of the periphery of the drum 690 and connects a plurality of orifice strips 692 for applying water or other fluid to a fibrous web 693 placed on the outside surface of the curved plates of the drum sleeve 691. Each orifice strip 692 may comprise one or more rows of fine diameter holes or apertures of the type mentioned above in FIG. 5. The aperture diameters can generally vary as described above. Water or other fluid is directed through the rows of orifices. In general, and as explained above, the pressure in each orifice group can be increased from the first group under which the fibrous web 693 passes to the last group. Although, the pressure can remain about the same in each orifice group. The pressure is controlled by control valves 697 and is monitored by pressure gauges 698. The drum 690 is connected to a pump 694, and a vacuum can be connected to the pump 694 and pulled therefrom to aid in removing water and to keep the area from flooding. In operation, the fibrous web 693 is placed on the upper surface of drum sleeve 692 before the water ejecting manifold 689. The fibrous web 693 passes underneath the orifice strips 692 and is formed into a structured nonwoven substrate. The formed nonwoven substrate is then passed over a section 695 of the apparatus where there are no orifice strips, but where a vacuum is continuously applied. After being dewatered under the vacuum, the structured nonwoven fabric is removed from the drum and passed around a series of dry cans 696 to dry.

The nonwoven substrate, either in the form of a tissue or wet wipe, as disclosed herein, can be tailored to provide sufficient in-use wet tensile strength and dispersibility. The nonwoven substrate can be made to be usable without breaking or tearing during use and to provide problem-free disposal once disposed in a household sanitation system.

In-use wet tensile and residual soak tensile measurements can be measured using a pneumatic grip gauge separation of 5.1 centimeters (cm) and a crosshead speed of 30.1 centimeters/minute (cm/min) as described in U.S. Pat. No. 8,133,825, which is incorporated herein in its entirety by reference. As used herein, in-use wet tensile strength refers to the tensile strength of the nonwoven substrate after being pre-moistened with a wetting composition. As used herein, residual soak tensile measurements refer to the tensile strength of the nonwoven substrate after being immersed in water for the indicated period of time.

Water dispersibility of the nonwoven substrate can be measured by the method described in U.S. Patent Publication No. 2012/0144611, which is incorporated herein in its entirety by reference. Briefly, the INDA Guidelines FG 511.2, Dispersibility Tipping Tube Test, can be used to assess the dispersibility or physical breakup of a flushable product during its transport through household and municipal conveyance systems (e.g., sewer pipe, pumps and lift stations). This test assesses the rate and extent of disintegration of samples by turbulent water via a capped tube that is tipped up and down.

A 1 L graduated cylinder is used to deliver 700 mL of room temperature tap water into a clear plastic acrylic tube measuring 500 mm (19.7 in) in height, with an inside diameter of 73 mm (2.9 in). Each sample in dropped into the tube and allowed to remain in contact with the water for 30 seconds. The top of the plastic tube is sealed with a water tight screw cap fitted with a rubber seal. The tube, initially in a vertical position, is then rotated 180 degrees in a counter clockwise direction (in approximately 1 s) and stopped (for approximately 1 s), then rotated another 180 degrees in a clockwise direction (in approximately 1 s) and stopped (for approximately 1 s). This represents 1 cycle. The test is stopped after 240 cycles.

The contents in the tube are then quickly poured over two screens arranged from top to bottom in descending order: 12 mm and 1.5 mm (diameter opening). A hand held showerhead spray nozzle is held approximately 10-15 cm above the sieve, and the material is gently rinsed through the nested screens for 2 min at a flow rate of 4 L/min (1 gal/min). The flow rate is assessed by measuring the time it takes to fill a 4 L beaker. After the two minutes of rinsing, the top screen is removed.

After rinsing is complete, the retained material is removed from each of the screens and the 12 mm sieve retained material is placed upon a separate labeled and tared aluminum weigh pan. The pan is placed into a drying oven for at least 12 hours at 105±3 degrees Celsius until the sample is dry. The dried samples are then cooled in a desiccator. After the samples are dry, their mass is determined. The retained fraction and the percentage of disintegration are calculated based on the initial starting mass of the test material. A high retained percent on the screen correlates with a lower water dispersibility.

The nonwoven substrate can be incorporated into a variety of products. Non-limiting examples of products include tissues/wipes, e.g., facial tissues and bath tissues, wipers (or wipes), such as wet wipers, dry wipers, or impregnated wipers, which include personal care wipers, household cleaning wipers, and dusting wipers. Personal care wipers, such as cosmetic wipers, medicated wipers, or medical cleaning wipers, can be impregnated with, e.g., emollients, humectants, fragrances, and the like. Household cleaning wipers or hard surface cleaning wipers can be impregnated with, e.g., surfactants (for example, quaternary amines), peroxides, chlorine, solvents, chelating agents, antimicrobials, fragrances, and the like. Dusting wipers can be impregnated with, e.g., oils.

Various types of wipers include baby wipes, cosmetic wipes, perinea wipes, disposable washcloths, household cleaning wipes, such as kitchen wipes, bath wipes, or hard surface wipes, disinfecting and germ removal wipes, specialty cleaning wipes, such as glass wipes, mirror wipes, leather wipes, electronics wipes, lens wipes, or polishing wipes, medical cleaning wipes, disinfecting wipes, cleaning implements/tools, and the like. Cleaning implements are tools used to clean, or remove debris from a surface. Debris can be any material or object which is desired to be picked up by the cleaning implement. Non-limiting examples of debris include material commonly found on floors, carpets, and countertops, such as lint, dirt, grass, thread, pins, paper clips and scraps of paper, as well as larger pieces of metal, plastic, wood, paper, fabric, glass, and in certain applications, objects such as keys, household items, small tools, etc. Debris may also be found on the surface of objects requiring cleaning or sanitizing, such as furniture, toys, clothing, appliances, office items, bathroom surfaces, such as toilets, sinks, and bathtubs, and the like.

As mentioned above, the nonwoven substrate can be a tissue or a wet wipe. The tissue or wet wipe can be pre-moistened with a wetting composition, which can include at least one additive. The wetting composition can be any solution, including, but not limited to, an aqueous solution comprising at least one additive. Non-limiting examples of suitable additives are provided below. The wetting composition can be disposed on or impregnated within the nonwoven substrate by any method. Examples of such methods include, but are not limited to, soaking the nonwoven substrate in the wetting composition and spraying the wetting composition onto the nonwoven substrate.

Relative to the weight of the dry nonwoven substrate, the nonwoven substrate comprises between about 10% to about 400% of the wetting composition. In one aspect, the nonwoven substrate comprises between about 100% to about 300% of the wetting composition, relative to the weight of the dry nonwoven substrate. In another aspect, the nonwoven substrate comprises between about 180% to about 240% of the wetting composition, relative to the dry weight of the nonwoven substrate.

As indicated above, a variety of additives can be employed with the nonwoven substrate products described herein. Suitable additives include, but are not limited to: odor control agents; detackifying agents if a binder is present in the non-woven substrate to reduce the tackiness of the binder; particulates; antimicrobial agents; preservatives; wetting agents and cleaning agents such as detergents, surfactants, and some silicones; emollients; surface feel modifiers for improved tactile sensation (e.g., lubricity) on the skin; fragrance; fragrance solubilizers; opacifiers; fluorescent whitening agents; UV absorbers; pharmaceuticals; and pH control agents, such as malic acid or potassium hydroxide.

Skin-care additives provide one or more benefits to the user, such as a reduction in the probability of having diaper rash and/or other skin damage caused by fecal enzymes. These enzymes, particularly trypsin, chymotrypsin and elastase, are proteolytic enzymes produced in the gastrointestinal tract to digest food. In infants, for example, the feces tend to be watery and contain, among other materials, bacteria, and some amounts of undegraded digestive enzymes. These enzymes, if they remain in contact with the skin for any appreciable period of time, may cause an irritation that is uncomfortable in itself and can predispose the skin to infection by microorganisms. As a countermeasure, skin-care additives include, but are not limited to, the enzyme inhibitors and sequestrants. The wetting composition can contain less than about 5 weight percent of skin-care additives based on the total weight of the wetting composition. More specifically, the wetting composition can contain from about 0.01 weight percent to about 2 weight percent of skin-care additives. Even more specifically, the wetting composition can contain from about 0.01 weight percent to about 0.05 weight percent of skin-care additives.

A variety of skin-care additives can be added to the wetting composition and the pre-moistened wipes of the present invention or included therein. For example, skin-care additives in the form of particles can be added to serve as fecal enzyme inhibitors, offering potential benefits in the reduction of diaper rash and skin damage caused by fecal enzymes. U.S. Pat. No. 6,051,749, which is incorporated herein by reference in its entirety, discloses organophilic clays in a woven or nonwoven web described as being useful for inhibiting fecal enzymes. Such materials can be used in the present invention, including reaction products of a long chain organic quaternary ammonium compound with one or more of the following clays: montmorillonite, bentonite, beidellite, hectorite, saponite, and stevensite.

Other known enzyme inhibitors and sequestrants can be used as skin-care additives in the wetting composition of the present invention, including those that inhibit trypsin and other digestive or fecal enzymes, and inhibitors for urease. For example, enzyme inhibitors and anti-microbial agents may be used to prevent the formation of odors in body fluids. For example, urease inhibitors, which are also said to play a role in odor absorption, are disclosed by in PCT International Publication No. 98/26808, which is incorporated herein by reference in its entirety. Such inhibitors can be incorporated into the wetting composition and the pre-moistened wipes of the present invention and include transition metal ions and their soluble salts, such as silver, copper, zinc, ferric, and aluminum salts. The anion may also provide urease inhibition, such as borate, phytate, etc. Compounds of potential value include, but are not limited to, silver chlorate, silver nitrate, mercury acetate, mercury chloride, mercury nitrate, copper metaborate, copper bromate, copper bromide, copper chloride, copper dichromate, copper nitrate, copper salicylate, copper sulfate, zinc acetate, zinc borate, zinc phytate, zinc bromate, zinc bromide, zinc chlorate, zinc chloride, zinc sulfate, cadmium acetate, cadmium borate, cadmium bromide, cadmium chlorate, cadmium chloride, cadmium formate, cadmium iodate, cadmium iodide, cadmium permanganate, cadmium nitrate, cadmium sulfate, and gold chloride.

Other salts known to have urease inhibition properties include ferric and aluminum salts, such as the nitrates, and bismuth salts. Other urease inhibitors include hydroxamic acid and its derivatives; thiourea; hydroxylamine; salts of phytic acid; extracts of plants of various species, including various tannins, e.g. carob tannin, and their derivatives such as chlorogenic acid derivatives; naturally occurring acids such as ascorbic acid, citric acid, and their salts; phenyl phosphoro diamidate/diamino phosphoric acid phenyl ester; metal aryl phosphoramidate complexes, including substituted phosphorodiamidate compounds; phosporamidates without substitution on the nitrogen; boric acid and/or its salts, including especially, borax, and/or organic boron acid compounds; the compounds disclosed in European Patent Application 408,199; sodium, copper, manganese, and/or zinc dithiocarbamate; quinones; phenols; thiurams; substituted rhodanine acetic acids; alkylated benzoquinones; formamidine disulphide; 1:3-diketones maleic anhydride; succinamide; phthalic anhydride; behenic acid; N,N-dihalo-2-imidazolidinones; N-halo-2-oxazolidinones; thio- and/or acyl-phosphoryltnamide and/or substituted derivatives thereof, thiopyridine-N-oxides, thiopyridines, and thiopyrimidines; oxidized sulfur derivatives of diaminophosphinyl compounds; cyclotriphosphazatriene derivatives; bromo-nitro compounds; S-aryl and/or alkyl diamidophosphorothiolates; diaminophosphinyl derivatives; mono- and/or poly-phosphorodiamide; alkoxy-1, 2-benzothiazine compounds; ortho-diaminophosphinyl derivatives of oximes; 5-substituted-benzoxathiol-2-ones; N(diammophosphinyl)arylcarboxamides; and the like.

Many other skin-care additives may be incorporated into the wetting composition and pre-moistened wipes of the present invention, including, but not limited to, sun blocking agents and UV absorbers, acne treatments, pharmaceuticals, baking soda (including encapsulated forms thereof), vitamins and their derivatives such as Vitamins A or E, botanicals such as witch hazel extract and aloe vera, allantoin, emollients, disinfectants, hydroxy acids for wrinkle control or anti-aging effects, sunscreens, tanning promoters, skin lighteners, deodorants and anti-perspirants, ceramides for skin benefits and other uses, astringents, moisturizers, nail polish removers, insect repellants, antioxidants, antiseptics, anti-inflammatory agents and the like. Useful materials for skin care and other benefits are listed in McCutcheon's 1999, Vol. 2: Functional Materials, MC Publishing Company, Glen Rock, N.J. Many useful botanicals for skin care are provided by Active Organics, Lewisville, Tex.

Suitable odor control additives for use in the wetting composition and pre-moistened wipes of the present invention include, but are not limited to, zinc salts; talc powder; encapsulated perfumes (including microcapsules, macrocapsules, and perfume encapsulated in liposomes, vessicles, or microemulsions); chelants, such as ethylenediamine tetraacetic acid; zeolites; activated silica, activated carbon granules or fibers; activated silica particulates; polycarboxylic acids, such as citric acid; cyclodextrins and cyclodextrin derivatives; chitosan or chitin and derivatives thereof; oxidizing agents; antimicrobial agents, including silver-loaded zeolites; triclosan; kieselguhr; and mixtures thereof. In addition to controlling odor from the body or body wastes, odor control strategies can also be employed to mask or control any odor of the treated substrate. Typically, the wetting composition contains less than about 5 weight percent of odor control additives based on the total weight of the wetting composition. In another aspect, the wetting composition contains from about 0.01 weight percent to about 2 weight percent of odor control additives. Yet, in another aspect, the wetting composition contains from about 0.03 weight percent to about 1 weight percent of odor control additives.

In one embodiment of the present invention, the wetting composition and/or pre-moistened wipes comprise derivatized cyclodextrins, such as hydroxypropyl beta-cyclodextrin in solution, which remain on the skin after wiping and provide an odor-absorbing layer. In other embodiments, the odor source is removed or neutralized by application of an odor-control additive, exemplified by the action of a chelant that binds metal groups necessary for the function of many proteases and other enzymes that commonly produce an odor. Chelating the metal group interferes with the enzyme's action and decreases the risk of malodor in the product.

Principles for the application of chitosan or chitin derivatives to nonwoven webs and cellulosic fibers are described by S. Lee et al. in "Antimicrobial and Blood Repellent Finishes for Cotton and Nonwoven Fabrics Based on Chitosan and Fluoropolymers," Textile Research Journal, 69(2); 104-112, February 1999.

If a binder is employed in the non-woven substrate, detackifying agents can be used in the wetting composition to reduce the tackiness of the binder. Suitable detackifiers include any substance known in the art to reduce tack between two adjacent fibrous sheets treated with an adhesive-like polymer or any substance capable of reducing the tacky feel of an adhesive-like polymer on the skin. Detackifiers can be applied as solid particles in dry form, as a suspension or as a slurry of particles. Deposition can be by spray, coating, electrostatic deposition, impingement, filtration (i.e., a pressure differential drives a particle-laden gas phase through the substrate, depositing particles by a filtration mechanism), and the like, and can be applied uniformly on one or more surfaces of the substrate or may be applied in a pattern (e.g., repeating or random patterns) over a portion of the surface or surfaces of the substrate. The detackifier can be present throughout the thickness of the substrate, but may be concentrated at one or both surfaces, and may be substantially only present on one or both surfaces of the substrate.

Specific detackifiers include, but are not limited to, powders, such as talc powder, calcium carbonate, mica; starches, such as corn starch; lycopodium powder; mineral fillers, such as titanium dioxide; silica powder; alumina; metal oxides in general; baking powder; kieselguhr; and the like. Polymers and other additives having low surface energy may also be used, including a wide variety of fluorinated polymers, silicone additives, polyolefins and thermoplastics, waxes, debonding agents known in the paper industry including compounds having alkyl side chains such as those having 16 or more carbons, and the like. Compounds used as release agents for molds and candle making may also be considered, as well as, dry lubricants and fluorinated release agents.

The wetting composition of the present invention can be further modified by the addition of solid particulates or microparticulates. Suitable particulates include, but are not limited to, mica, silica, alumina, calcium carbonate, kaolin, talc, and zeolites. The particulates can be treated with stearic acid or other additives to enhance the attraction or bridging of the particulates to the binder system, if desired. Also, two-component microparticulate systems, commonly used as retention aids in the papermaking industry, can be used. Such two-component microparticulate systems generally comprise a colloidal particle phase, such as silica particles, and a water-soluble cationic polymer for bridging the particles to the fibers of the web to be formed. The presence of particulates in the wetting composition can serve one or more useful functions, such as (1) increasing the opacity of the pre-moistened wipes; (2) modifying the rheology or reducing the tackiness of the pre-moistened wipe; (3) improving the tactile properties of the wipe; or (4) delivering desired agents to the skin via a particulate carrier, such as a porous carrier or a microcapsule. Typically, the wetting composition contains less than about 25 weight percent of particulate based on the total weight of the wetting composition. In another aspect, the wetting composition contains from about 0.05 weight percent to about 10 weight percent of microparticulate. Yet, in another aspect, the wetting composition contains from about 0.1 weight percent to about 5 weight percent of microparticulate.

Microcapsules and other delivery vehicles can also be used in the wetting composition of the present invention to provide skin-care agents; medications; comfort promoting agents, such as eucalyptus; perfumes; odor control additives; vitamins; powders; and other additives to the skin of the user. For example, the wetting composition can contain up to about 25 weight percent of microcapsules or other delivery vehicles based on the total weight of the wetting composition. In another aspect, the wetting composition can contain from about 0.05 weight percent to about 10 weight percent of microcapsules or other delivery vehicles. Yet, in another aspect, the wetting composition can contain from about 0.2 weight percent to about 5.0 weight percent of microcapsules or other delivery vehicles.

Microcapsules and other delivery vehicles are well known in the art. For example, POLY-PORE® E200 (Chemdal Corp., Arlington Heights, Ill.), is a delivery agent comprising soft, hollow spheres that can contain an additive at over 10 times the weight of the delivery vehicle. Known additives reported to have been used with POLY-PORE® E200 include, but are not limited to, benzoyl peroxide, salicylic acid, retinol, retinyl palmitate, octyl methoxycinnamate, tocopherol, silicone compounds (DC 435), and mineral oil. Another delivery vehicle which can be employed with non-woven fabric is a sponge-like material marketed as POLY-PORE® L200, which is reported to have been used with silicone (DC 435) and mineral oil. Other known delivery systems include cyclodextrins and their derivatives, liposomes, polymeric sponges, and spray-dried starch. Additives present in microcapsules are isolated from the environment and the other agents in the wetting composition until the wipe is applied to the skin, whereupon the microcapsules break and deliver their load to the skin or other surfaces.

The wetting composition of the present invention can contain preservatives and/or anti-microbial agents. Several preservatives and/or anti-microbial agents useful in the present invention include, but are not limited to, Mackstat H 66 (available from McIntyre Group, Chicago, Ill.), DMDM hydantoin (e.g., Glydant Plus™, Lonza, Inc., Fair Lawn, N.J.), iodopropynyl butylcarbamate, Kathon (Rohm and Hass, Philadelphia, Pa.), methylparaben, propylparaben, 2-bromo-2-nitropropane-1,3-diol, benzoic acid, and the like. Typically, the wetting composition contains less than about 2 weight percent on an active basis of preservatives and/or antimicrobial agents based on the total weight of the wetting composition. In another aspect, the wetting composition contains from about 0.01 weight percent to about 1 weight percent of preservatives and/or anti-microbial agents. Yet, in another aspect, the wetting composition contains from about 0.01 weight percent to about 0.5 weight percent of preservatives and/or anti-microbial agents.

A variety of wetting agents and/or cleaning agents can be used in the wetting composition of the present invention. Suitable wetting agents and/or cleaning agents include, but are not limited to, detergents and nonionic, amphoteric, and anionic surfactants, especially amino acid-based surfactants. Amino acid-based surfactant systems, such as those derived from amino acids L-glutamic acid and other natural fatty acids, offer pH compatibility to human skin and good cleansing power, while being relatively safe and providing improved tactile and moisturization properties compared to other anionic surfactants. One function of the surfactant is to improve wetting of the dry substrate with the wetting composition. Another function of the surfactant can be to disperse bathroom soils when the pre-moistened wipe contacts a soiled area and to enhance their absorption into the substrate. The surfactant can further assist in make-up removal, general personal cleansing, hard surface cleansing, odor control, and the like.

One commercial example of an amino-acid based surfactant is acylglutamate, marketed under the Amisoft name by Ajinomoto Corp., Tokyo, Japan. Typically, the wetting composition contains less than about 3 weight percent of wetting agents and/or cleaning agents based on the total weight of the wetting composition. In another aspect, the wetting composition contains from about 0.01 weight percent to about 2 weight percent of wetting agents and/or cleaning agents. Yet, in another aspect, the wetting composition contains from about 0.1 weight percent to about 0.5 weight percent of wetting agents and/or cleaning agents.

In addition to amino-acid based surfactants, a wide variety of surfactants can be used in the present invention. Suitable non-ionic surfactants include, but are not limited to, the condensation products of ethylene oxide with a hydrophobic (oleophilic) polyoxyalkylene base formed by the condensation of propylene oxide with propylene glycol. The hydrophobic portion of these compounds desirably has a molecular weight sufficiently high so as to render it water-insoluble. The addition of polyoxyethylene moieties to this hydrophobic portion increases the water-solubility of the molecule as a whole, and the liquid character of the product is retained up to the point where the polyoxyethylene content is about 50% of the total weight of the condensation product. Examples of compounds of this type include commercially-available Pluronic surfactants (BASF Wyandotte Corp.), such as those in which the polyoxypropylene ether has a molecular weight of about 1500-3000 and the polyoxyethylene content is about 35-55% of the molecule by weight, i.e. Pluronic L-62.

Other useful nonionic surfactants include, but are not limited to, the condensation products of C8-C22 alkyl alcohols with 2-50 moles of ethylene oxide per mole of alcohol. Examples of compounds of this type include the commercially-available Poly-Tergent SLF series from Olin Chemicals or the TERGITOL® series from Union Carbide, i.e. TERGITOL® 25-L-7, which is formed by condensing about 7 moles of ethylene oxide with a C12-C15 alkanol.

Other nonionic surfactants, which can be employed in the wetting composition of the present invention, include the ethylene oxide esters of C6-C12 alkyl phenols such as (nonylphenoxy)polyoxyethylene ether. Particularly useful are the esters prepared by condensing about 8-12 moles of ethylene oxide with nonylphenol, i.e. the IGEPAL® CO series (GAF Corp.). Further non-ionic surface active agents include, but are not limited to, alkyl polyglycosides (APG), derived as a condensation product of dextrose (D-glucose) and a straight or branched chain alcohol. The glycoside portion of the surfactant provides a hydrophile having high hydroxyl density, which enhances water solubility. Additionally, the inherent stability of the acetal linkage of the glycoside provides chemical stability in alkaline systems. Furthermore, unlike some non-ionic surface active agents, alkyl polyglycosides have no cloud point, allowing one to formulate without a hydrotrope, and these are very mild, as well as readily biodegradable non-ionic surfactants. This class of surfactants is available from Horizon Chemical under the trade names of APG-300, APG-350, APG-500, and APG-500.

Silicones are another class of wetting agents available in pure form, or as microemulsions, macroemulsions, and the like. One exemplary non-ionic surfactant group is the silicone-glycol copolymers. These surfactants are prepared by adding poly(lower)alkylenoxy chains to the free hydroxyl groups of dimethylpolysiloxanols and are available from the Dow Corning Corp as Dow Corning 190 and 193 surfactants (CTFA name: dimethicone copolyol). These surfactants function, with or without any volatile silicones used as solvents, to control foaming produced by the other surfactants, and also impart a shine to metallic, ceramic, and glass surfaces.

Anionic surfactants can be used in the wetting compositions of the present invention. Anionic surfactants are useful due to their high detergency include anionic detergent salts having alkyl substituents of 8 to 22 carbon atoms such as the water-soluble higher fatty acid alkali metal soaps, e.g., sodium myristate and sodium palmitate. A preferred class of anionic surfactants encompasses the water-soluble sulfated and sulfonated anionic alkali metal and alkaline earth metal detergent salts containing a hydrophobic higher alkyl moiety (typically containing from about 8 to 22 carbon atoms) such as salts of higher alkyl mono or polynuclear aryl sulfonates having from about 1 to 16 carbon atoms in the alkyl group, with examples available as the Bio-Soft series, i.e. Bio-Soft D-40 (Stepan Chemical Co.).

Other useful classes of anionic surfactants include, but are not limited to, the alkali metal salts of alkyl naphthalene sulfonic acids (methyl naphthalene sodium sulfonate, Petro AA, Petrochemical Corporation); sulfated higher fatty acid monoglycerides such as the sodium salt of the sulfated monoglyceride of cocoa oil fatty acids and the potassium salt of the sulfated monoglyceride of tallow fatty acids; alkali metal salts of sulfated fatty alcohols containing from about 10 to 18 carbon atoms (e.g., sodium lauryl sulfate and sodium stearyl sulfate); sodium C14-C16-alphaolefin sulfonates such as the Bio-Terge series (Stepan Chemical Co.); alkali metal salts of sulfated ethyleneoxy fatty alcohols (the sodium or ammonium sulfates of the condensation products of about 3 moles of ethylene oxide with a C12-C15 n-alkanol, i.e., the Neodol ethoxysulfates, Shell Chemical Co.); alkali metal salts of higher fatty esters of low molecular weight alkylol sulfonic acids, e.g. fatty acid esters of the sodium salt of isothionic acid, the fatty ethanolamide sulfates; the fatty acid amides of amino alkyl sulfonic acids, e.g. lauric acid amide of taurine; as well as numerous other anionic organic surface active agents such as sodium xylene sulfonate, sodium naphthalene sulfonate, sodium toulene sulfonate and mixtures thereof.

A further useful class of anionic surfactants includes the 8-(4-n-alkyl-2-cyclohexenyl)-octanoic acids, wherein the cyclohexenyl ring is substituted with an additional carboxylic acid group. These compounds or their potassium salts, are commercially-available from Westvaco Corporation as Diacid 1550 or H-240. In general, these anionic surface active agents can be employed in the form of their alkali metal salts, ammonium or alkaline earth metal salts.

The wetting composition can further comprise an aqueous microemulsion of silicone particles. For example, U.S. Pat. No. 6,037,407, which is incorporated herein in its entirety by reference, describes organopolysiloxanes in an aqueous microemulsion. Typically, the wetting composition contains less than about 5 weight percent of a microemulsion of silicone particles based on the total weight of the wetting composition. In another aspect, the wetting composition contains from about 0.02 weight percent to about 3 weight percent of a microemulsion of silicone particles. Yet, in another aspect, the wetting composition contains from about 0.02 weight percent to about 0.5 weight percent of a microemulsion of silicone particles.

Silicone emulsions in general can be applied to the pre-moistened wipe by any known coating method. For example, the pre-moistened wipe may be moistened with a wetting composition comprising a water-dispersible or water-miscible, silicone-based component. Further, the wipe can comprise a nonwoven web of fibers having a water-dispersible binder, wherein the web is moistened with a lotion comprising a silicone-based sulfosuccinate. The silicone-based sulfosuccinate provides gentle and effective cleansing without a high level of surfactant. Additionally, the silicone-based sulfosuccinate provides a solubilization function, which prevents precipitation of oil-soluble components, such as fragrance components, vitamin extracts, plant extracts, and essential oils.

In one aspect of the present invention, the wetting composition comprises a silicone copolyol sulfosuccinate, such as disodium dimethicone copolyol sulfosuccinate and diammonium dimethicone copolyolsulfosuccinate. In one aspect, the wetting composition comprises less than about 2 percent by weight of the silicone-based sulfosuccinate, and, in another aspect, from about 0.05 percent to about 0.30 percent by weight of the silicone-based sulfosuccinate.

In another example of a product comprising a silicone emulsions, Dow Corning 9506 powder can be present in the wetting composition. Dow Corning 9506 powder is believed to comprise a dimethicone/vinyldimethicone cross-polymer and is a spherical powder, which is said to be useful in controlling skin oils (see "New Chemical Perspectives," Soap and Cosmetics, Vol. 76, No. 3, March 2000, p. 12). Thus, a water-dispersible wipe, which delivers a powder effective in controlling skin oil, is also within the scope of the present invention. Principles for preparing silicone emulsions are disclosed in WO 97/10100.

The wetting composition of the present invention can contain one or more emollients. Suitable emollients include, but are not limited to, PEG 75 lanolin, methyl gluceth 20 benzoate, C12-C15 alkyl benzoate, ethoxylated cetyl stearyl alcohol, products marketed as Lambent wax WS-L, Lambent WD-F, Cetiol HE (Henkel Corp.), Glucam P20 (Amerchol), Polyox WSR N-10 (Union Carbide), Polyox WSR N-3000 (Union Carbide), Luviquat (BASF), Finsolv SLB 101 (Finetex Corp.), mink oil, allantoin, stearyl alcohol, Estol 1517 (Unichema), and Finsolv SLB 201 (Finetex Corp.).

An emollient can also be applied to a surface of the non-woven fabric prior to or after wetting with the wetting composition. Such an emollient can be insoluble in the wetting composition and can be immobile except when exposed to a force. For example, a petrolatum-based emollient can be applied to one surface in a pattern, after which the other surface is wetted to saturate the wipe. Such a product could provide a cleaning surface and an opposing skin treatment surface.

The emollient composition in such products and other products of the present invention can comprise a plastic or fluid emollient such as one or more liquid hydrocarbons (e.g., petrolatum), mineral oil and the like, vegetable and animal fats (e.g., lanolin, phospholipids and their derivatives) and/or a silicone materials such as one or more alkyl substituted polysiloxane polymers, including the polysiloxane emollients disclosed in U.S. Pat. No. 5,891,126, which is incorporated herein in its entirety by reference. Optionally, a hydrophilic surfactant can be combined with a plastic emollient to improve wettability of the coated surface. In some embodiments of the present invention, it is contemplated that liquid hydrocarbon emollients and/or alkyl substituted polysiloxane polymers may be blended or combined with one or more fatty acid ester emollients derived from fatty acids or fatty alcohols.

In one aspect of the present invention, the emollient material is in the form of an emollient blend. For example, the emollient blend can comprise a combination of one or more liquid hydrocarbons (e.g., petrolatum), mineral oil and the like, vegetable and animal fats (e.g., lanolin, phospholipids and their derivatives), with a silicone material such as one or more alkyl substituted polysiloxane polymers. In another aspect, the emollient blend comprises a combination of liquid hydrocarbons (e.g., petrolatum) with dimethicone or with dimethicone and other alkyl substituted polysiloxane polymers. In some embodiments of the present invention, it is contemplated that blends of liquid hydrocarbon emollients and/or alkyl substituted polysiloxane polymers may be blended with one or more fatty acid ester emollients derived from fatty acids or fatty alcohols. PEG-7 glyceryl cocoate, available as Standamul HE (Henkel Corp., Hoboken, N.J), can also be considered.

Water-soluble, self-emulsifying emollient oils, which are useful in the present wetting compositions, include the polyoxyalkoxylated lanolins and the polyoxyalkoxylated fatty alcohols, as disclosed in U.S. Pat. No. 4,690,821, which is incorporated herein in its entirety by reference. The polyoxyalkoxy chains comprise mixed propylenoxy and ethyleneoxy units. The lanolin derivatives typically comprise about 20-70 such lower-alkoxy units while the C12-C20 fatty alcohols will be derivatized with about 8-15 lower-alkyl units. One such useful lanolin derivative is Lanexol AWS (PPG-12-PEG-50, Croda, Inc., New York, N.Y.). A useful poly(15-20)C2-C3-alkoxylate is PPG-5-Ceteth-20, known as Procetyl AWS (Croda, Inc.).

Typically, the wetting composition contains less than about 25 weight percent of emollients based on the total weight of the wetting composition. In another aspect, the wetting composition can comprise less than about 5 weight percent emollient, and, in yet another aspect, less than about 2% emollient. Still, in another aspect, the wetting composition can contain from about 0.01 weight percent to about 8 weight percent of emollients. Yet still, in another aspect, the wetting composition can contain from about 0.2 weight percent to about 2 weight percent of emollients.

In one aspect, the wetting composition and/or pre-moistened wipes of the present invention comprise an oil-in-water emulsion comprising an oil phase containing at least one emollient oil and at least one emollient wax stabilizer dispersed in an aqueous phase comprising at least one polyhydric alcohol emollient and at least one organic water-soluble detergent, as disclosed in U.S. Pat. No. 4,559,157, the entirety of which is herein incorporated by reference.

Surface-feel modifiers can be employed with the nonwoven fabric of the present invention to improve the tactile sensation (e.g., lubricity) of the skin during use of the product. Suitable surface feel modifiers include, but are not limited to, commercial debonders; and softeners, such as the softeners used in the art of tissue making including quaternary ammonium compounds with fatty acid side groups, silicones, waxes, and the like. Exemplary quaternary ammonium compounds with utility as softeners are disclosed in U.S. Pat. Nos. 3,554,862; 4,144,122; 5,573,637; and 4,476,323, the entirety of all of which is herein incorporated by reference. Typically, the wetting composition contains less than about 2 weight percent of surface feel modifiers based on the total weight of the wetting composition. In another aspect, the wetting composition contains from about 0.01 weight percent to about 1 weight percent of surface feel modifiers. Yet, in another aspect, the wetting composition contains from about 0.01 weight percent to about 0.05 weight percent of surface feel modifiers.

A variety of fragrances can be used in the wetting composition of the present invention. Typically, the wetting composition contains less than about 2 weight percent of fragrances based on the total weight of the wetting composition. In another aspect, the wetting composition contains from about 0.01 weight percent to about 1 weight percent of fragrances. Yet, in another aspect, the wetting composition contains from about 0.01 weight percent to about 0.05 weight percent of fragrances.

Further, a variety of fragrance solubilizers can be used in the wetting composition of the present invention. Suitable fragrance solubilizers include, but are not limited to, polysorbate 20, propylene glycol, ethanol, isopropanol, diethylene glycol monoethyl ether, dipropylene glycol, diethyl phthalate, triethyl citrate, Ameroxol OE-2 (Amerchol Corp.), Brij 78 and Brij 98 (ICI Surfactants), Arlasolve 200 (ICI Surfactants), Calfax 16L-35 (Pilot Chemical Co.), Capmul POE-S(Abitec Corp.), Finsolv SUBSTANTIAL (Finetex), and the like. Typically, the wetting composition contains less than about 2 weight percent of fragrance solubilizers based on the total weight of the wetting composition. In another aspect, the wetting composition contains from about 0.01 weight percent to about 1 weight percent of fragrance solubilizers. Yet, in another aspect, the wetting composition contains from about 0.01 weight percent to about 0.05 weight percent of fragrance solubilizers.

Opacifers can be employed in the wetting composition. Suitable opacifiers include, but are not limited to, titanium dioxide or other minerals or pigments, and synthetic opacifiers such as REACTOPAQUE® particles (available from Sequa Chemicals, Inc., Chester, S.C.). Typically, the wetting composition contains less than about 2 weight percent of opacifiers based on the total weight of the wetting composition. In another aspect, the wetting composition contains from about 0.01 weight percent to about 1 weight percent of opacifiers. Yet, in another aspect, the wetting composition contains from about 0.01 weight percent to about 0.05 weight percent of opacifiers.

Suitable pH control agents for use in the wetting composition of the present invention include, but are not limited to, malic acid, citric acid, hydrochloric acid, acetic acid, sodium hydroxide, potassium hydroxide, and the like. An appropriate pH range minimizes the amount of skin irritation resulting from the wetting composition on the skin. Typically, the pH range of the wetting composition is from about 3.5 to about 6.5. In another aspect, the pH range of the wetting composition is from about 4 to about 6. Sill, in another aspect, the wetting composition contains less than about 2 weight percent of a pH adjuster based on the total weight of the wetting composition. In another aspect, the wetting composition contains from about 0.01 weight percent to about 1 weight percent of a pH adjuster. Yet, in another aspect, the wetting composition contains from about 0.01 weight percent to about 0.05 weight percent of a pH adjuster.

A variety of wetting compositions, formed from one or more of the above-described components, can be used with the wet wipes of the present invention.

The tissue or wipe can be individually folded and packaged in a moisture proof envelope, or packaged in containers holding any desired number of sheets in a water-tight package. The finished tissues or wipes also can be packaged as a roll of separable sheets in a moisture-proof container, which can hold any desired number of sheets on the roll with a wetting composition applied to the wipes. The roll can be coreless and either hollow or solid. Coreless rolls, including rolls with a hollow center or without a solid center, can be produced with known coreless roll winders, including those available from SRP Industry, Inc. (San Jose, Calif.); Shimizu Manufacturing (Japan), and the devices disclosed in U.S. Pat. No. 4,667,890, which is incorporated herein in its entirety by reference. Solid-wound coreless rolls can offer more product for a given volume and can be adapted for a wide variety of dispensers. The water dispersible nonwoven substrate can be packaged into any impermeable envelopes and storage package for suitable for wet-packaged materials.

In one aspect, a water-dispersible nonwoven substrate comprises a structured web of fibers comprising a first surface and a second surface, the first surface having substantially filled protrusions extending outwardly from the first surface, and the portions of the web between the protrusions defining connecting regions disposed between the protrusions; wherein the average fiber densities of the protrusions and connecting regions are substantially the same, and the fibers are individualized plant-based fibers, reconstituted cellulosic fibers, or a combination thereof.

The fibers can have a mean length of at least 6 millimeters (mm). In another aspect, the fibers have a mean length in a range between about 6 and about 8 mm. Yet, in another aspect, the fibers are present in an amount of at least 30 weight percent (wt. %) based on the total weight of the nonwoven substrate. Still yet, in another aspect, the fibers have a mean length in a range between about 6 and about 12 mm. In one aspect, the fibers are present in an amount in a range between about 15 and about 25 wt. % based on the total weight of the nonwoven substrate. In another aspect, the fibers have a mean length in a range between about 14 and about 16 mm. Yet, in another aspect, the fibers are present in an amount in a range between about 10 and about 15 wt. % based on the total weight of the nonwoven substrate.

In one aspect, the nonwoven substrate is impregnated with a wetting composition comprising least one additive. In another aspect, the additive is a skin care additive, an odor control additive, a de-tackifying agent, a microparticulate, a microcapsule, a preservative, an anti-bacterial agent, a wetting agent, a cleaning agent, a microemulsion, an emollient, a surface feel modifier, a fragrance, a fragrance solubilizer, an opacifier, or a pH control agent.

The individualized plant-based fibers can be flax fibers, hemp fibers, jute fibers, ramie fibers, nettle fibers, Spanish broom fibers, kenaf plant fibers, or any combination thereof. The individualized plant-based fibers can be bast fibers. In one aspect, the individualized plant-based fibers are substantially pectin-free fibers. The regenerated cellulosic fibers can be flat-shaped or ribbon-shaped. In another aspect, the water-dispersible nonwoven substrate can include wood pulp fibers. Yet, in another aspect, the nonwoven substrate has a basis weight is in a range between about 40 and about 100 grams per square meter (gsm). In another aspect, the fibers are hydroentangled.

The water-dispersible nonwoven substrate can be a wet wipe, a dry wipe, or an impregnated wipe. In one aspect, the nonwoven substrate is a tissue, a facial tissue, a bath tissue, a baby wipe, a personal care wipe, a personal protective wipe, a cosmetic wipe, a perinea wipe, a disposable washcloth, a kitchen wipe, an automotive wipe, a bath wipe, a hard surface wipe, a cleaning wipe, a disinfecting wipe, a glass wipe, a mirror wipe, a leather wipe, an electronics wipe, a lens wipe, a polishing wipe, a medical cleaning wipe, a disinfecting wipe, or a cleaning implement.

In another aspect, a water-dispersible nonwoven substrate includes at least two plies of a structured web of fibers comprising a first surface and a second surface, the first surface having substantially filled protrusions extending outwardly from the first surface, and the portions of the web between the protrusions defining connecting regions disposed between the protrusions; wherein the average fiber densities of the protrusions and connecting regions are substantially the same, and the fibers are individualized plant-based fibers, reconstituted cellulosic fibers, or a combination thereof. Yet, in another aspect, the fibers have a mean length of at least 6 mm. Still yet, in another aspect, each ply has a basis weight in a range between about 20 and about 50 gsm. The fibers can have a mean length in a range between about 6 and about 8 mm. In one aspect, the fibers can be present in an amount of at least 30 wt. % based on the total weight of the nonwoven substrate. In another aspect, the fibers can have a mean length in a range between about 6 and about 12 mm. The fibers can be present in an amount between about 15 and about 25 wt. % based on the total weight of the nonwoven substrate. The fibers can have a mean length in a range between about 14 and about 16 mm. The fibers present in an amount between about 10 and about 15 wt. % based on the total weight of the nonwoven substrate. Yet, in another aspect, the nonwoven substrate is impregnated with a wetting composition comprising least one additive. The additive can be a skin care additive, an odor control additive, a de-tackifying agent, a microparticulate, a microcapsule, a preservative, an anti-bacterial agent, a wetting agent, a cleaning agent, a microemulsion, an emollient, a surface feel modifier, a fragrance, a fragrance solubilizer, an opacifier, or a pH control agent.

The individualized plant-based fibers can be flax fibers, hemp fibers, jute fibers, ramie fibers, nettle fibers, Spanish broom fibers, kenaf plant fibers, or any combination thereof. In one aspect, the individualized plant-based fibers are bast fibers. In another aspect, the regenerated cellulosic fibers are flat-shaped or ribbon-shaped. Yet, in another aspect, the nonwoven substrate includes wood pulp fibers.

Still yet, in another aspect, the nonwoven substrate is a wet wipe, a dry wipe, or an impregnated wipe. In one aspect, the nonwoven substrate is a tissue, a facial tissue, a bath tissue, a baby wipe, a personal care wipe, a personal protective wipe, a cosmetic wipe, a perinea wipe, a disposable washcloth, a kitchen wipe, an automotive wipe, a bath wipe, a hard surface wipe, a cleaning wipe, a disinfecting wipe, a glass wipe, a mirror wipe, a leather wipe, an electronics wipe, a lens wipe, a polishing wipe, a medical cleaning wipe, a disinfecting wipe, or a cleaning implement.

In another aspect, an adhesive is disposed between the two plies. Yet, in another aspect, the adhesive is a polyvinyl alcohol adhesive or an ion-triggerable adhesive. Still yet, in another aspect, the two plies are adhered to each other without an adhesive.

In one aspect, the method of making a water-dispersible nonwoven substrate comprising a structured web includes forming a web of fibers; and entangling the fibers on a perforated surface to form the structured web; wherein the structured web comprises a first surface and a second surface, the first surface having substantially filled protrusions extending outwardly from the first surface, and the portions of the web between the protrusions defining connecting regions disposed between the protrusions; the average fiber densities of the protrusions and connecting regions are substantially the same, and the fibers are individualized plant-based fibers, reconstituted cellulosic fibers, or a combination thereof. In another aspect, the perforated surface is a perforated belt. Yet, in another aspect, entangling is hydroentangling. Still yet, in another aspect, forming the web is a wet-laid process. In one aspect, forming the web is dry-laid process.

In another aspect, the method further includes impregnating the nonwoven substrate with a wetting composition comprising least one additive. The additive can be a skin care additive, an odor control additive, a de-tackifying agent, a microparticulate, a microcapsule, a preservative, an anti-bacterial agent, a wetting agent, a cleaning agent, a microemulsion, an emollient, a surface feel modifier, a fragrance, a fragrance solubilizer, an opacifier, or a pH control agent.

Yet, in another aspect, the fibers are flax fibers, hemp fibers, jute fibers, ramie fibers, nettle fibers, Spanish broom fibers, kenaf plant fibers, or any combination thereof. Still yet, in another aspect, the fibers are bast fibers. In one aspect, the nonwoven substrate is a wet wipe, a dry wipe, or an impregnated wipe. In another aspect, the nonwoven substrate forms a first ply, and the method further comprises adhering a second ply of the nonwoven substrate to the first ply to form a multi-ply nonwoven substrate. Yet, in another aspect, adhering is printing an adhesive onto the first ply and then disposing the second ply onto the first ply.

Still yet, in another aspect, a water-dispersible multi-ply nonwoven substrate includes at least two plies of a web of fibers, the fibers being individualized plant-based fibers, reconstituted cellulosic fibers, or a combination thereof. In one aspect, the fibers have a mean length of at least 6 mm. In another aspect, the fibers have a mean length in a range between about 6 and about 8 mm. Yet, in another aspect, the fibers are present in an amount of at least about 30 wt. % based on the total weight of the nonwoven substrate. Still yet, in another aspect, the cellulosic fibers have a mean length in a range between about 6 and about 12 mm. In one aspect, the fibers are present in an amount between about 15 and about 25 wt. % based on the total weight of the nonwoven substrate. In another aspect, the fibers have a mean length in a range between about 14 and about 16 mm. Yet, in another aspect, the fibers are present in an amount between about 10 and about 15 wt. % based on the total weight of the nonwoven substrate.

Still yet, in another aspect, the nonwoven substrate is impregnated with a wetting composition comprising least one additive. In one aspect, the at least one additive is a skin care additive, an odor control additive, a de-tackifying agent, a microparticulate, a microcapsule, a preservative, an anti-bacterial agent, a wetting agent, a cleaning agent, a microemulsion, an emollient, a surface feel modifier, a fragrance, a fragrance solubilizer, an opacifier, or a pH control agent.

In another aspect, the individualized plant-based fibers are flax fibers, hemp fibers, jute fibers, ramie fibers, nettle fibers, Spanish broom fibers, kenaf plant fibers, or any combination thereof. Yet, in another aspect, the individualized plant-based fibers are bast fibers. Still yet, in another aspect, the regenerated cellulosic fibers are flat-shaped or ribbon-shaped. In one aspect, the nonwoven substrate further comprises wood pulp fibers.

In another aspect, the nonwoven substrate is a wet wipe, a dry wipe, or an impregnated wipe. In one aspect, the nonwoven substrate is a tissue, a facial tissue, a bath tissue, a baby wipe, a personal care wipe, a personal protective wipe, a cosmetic wipe, a perinea wipe, a disposable washcloth, a kitchen wipe, an automotive wipe, a bath wipe, a hard surface wipe, a cleaning wipe, a disinfecting wipe, a glass wipe, a mirror wipe, a leather wipe, an electronics wipe, a lens wipe, a polishing wipe, a medical cleaning wipe, a disinfecting wipe, or a cleaning implement. Yet, in another aspect, the fibers are hydroentangled.

Still yet, in another aspect, a method of making a water-dispersible multi-ply nonwoven substrate includes forming two webs of fibers, the fibers being individualized plant-based fibers, regenerated cellulosic fibers, or a combination thereof; entangling the fibers of each web to form a first ply and a second ply; and disposing the first ply onto the second ply to form the multi-ply nonwoven substrate. In one aspect, the fibers have a mean length of at least 6 mm. Yet, in another aspect, each ply has a basis weight in a range between about 40 and about 100 gsm. Still yet, in another aspect, engtangling is hydroentangling. In one aspect, forming is a wet-laid process. In another aspect, forming is dry-laid process.

Yet, in another aspect, the method further comprises impregnating the nonwoven substrate with a wetting composition comprising least one additive. Still yet, in another aspect, the additive is a skin care additive, an odor control additive, a de-tackifying agent, a microparticulate, a microcapsule, a preservative, an anti-bacterial agent, a wetting agent, a cleaning agent, a microemulsion, an emollient, a surface feel modifier, a fragrance, a fragrance solubilizer, an opacifier, or a pH control agent.

In one aspect, the individualized plant-based fibers are flax fibers, hemp fibers, jute fibers, ramie fibers, nettle fibers, Spanish broom fibers, kenaf plant fibers, or any combination thereof. In another aspect, the individualized plant-based fibers are bast fibers. Yet, in another aspect, the water-dispersible multi-ply nonwoven substrate is a wet wipe, a dry wipe, or an impregnated wipe. Still yet, in another aspect, the multi-ply nonwoven substrate is a tissue, a facial tissue, a bath tissue, a baby wipe, a personal care wipe, a personal protective wipe, a cosmetic wipe, a perinea wipe, a disposable washcloth, a kitchen wipe, an automotive wipe, a bath wipe, a hard surface wipe, a cleaning wipe, a disinfecting wipe, a glass wipe, a mirror wipe, a leather wipe, an electronics wipe, a lens wipe, a polishing wipe, a medical cleaning wipe, a disinfecting wipe, or a cleaning implement. Still yet, in another aspect, the cellulosic fibers are regenerated cellulosic fibers. In one aspect, the regenerated cellulosic fibers are flat-shaped or ribbon-shaped.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A water-dispersible nonwoven substrate comprising:
a structured web comprising entangled cellulosic fibers, the structured web having a first surface and a second surface, the first surface having substantially filled protrusions extending outwardly from the first surface, and the portions of the web between the protrusions defining connecting regions disposed between the protrusions; wherein the average fiber densities of the protrusions and connecting regions are substantially the same, and the second surface is substantially free of depressions; or
at least two plies of an unstructured web comprising cellulosic fibers, each ply of the unstructured web being separately produced and comprising entangled cellulosic fibers;
wherein the cellulosic fibers are individualized, substantially straight, smooth, non-fibrillated and substantially pectin-free bast fibers, and
further comprising reconstituted cellulosic fibers, wood pulp fibers, or a combination thereof.

2. The water-dispersible nonwoven substrate of claim 1, wherein the reconstituted cellulosic fibers have a flat shape or a ribbon shape.

3. The water-dispersible nonwoven substrate of claim 1, wherein the cellulosic fibers have a mean length in a range between about 6 and about 12 millimeters (mm).

4. The water-dispersible nonwoven substrate of claim 1, wherein the cellulosic fibers have a mean length of at least 6 millimeters (mm).

5. The water-dispersible nonwoven substrate of claim 1, wherein cellulosic fibers are present in an amount of at least 30 weight percent (wt. %) based on the total weight of the water-dispersible nonwoven substrate.

6. The water-dispersible nonwoven substrate of claim 1, wherein the water-dispersible nonwoven substrate is a wet wipe, a dry wipe, an impregnated wipe, or a component of a cleaning tool or implement.

7. The water-dispersible nonwoven substrate of claim 1, wherein the cellulosic fibers are hydroentangled.

8. The water-dispersible nonwoven substrate of claim 1, wherein the nonwoven substrate has a total basis weight in a range between about 20 and about 100 grams per square meter (gsm).

9. The water-dispersible nonwoven substrate of claim 1, wherein the nonwoven substrate is impregnated with a wetting composition comprising at least one additive.

10. The water-dispersible nonwoven substrate of claim 1, wherein the individualized, substantially pectin-free fibers have less than 20% by weight of the pectin content of naturally occurring fibers from which the individualized, substantially pectin-free fibers are derived.

11. The water-dispersible nonwoven substrate of claim 1, wherein the cellulosic fibers are present in an amount of about 32 wt. % to about 100% wt. % based on a total weight of the water-dispersible nonwoven substrate.

12. The water-dispersible nonwoven substrate of claim 1, wherein the cellulosic fibers are present in an amount of about 35 wt. % to about 100% wt. % based on a total weight of the water-dispersible nonwoven substrate.

13. A method of making the water-dispersible nonwoven substrate of claim 1, the method comprising forming a web of the cellulosic fibers and hydroentangling the cellulosic fibers on a perforated surface to form the structured web.

14. A multi-ply water-dispersible nonwoven substrate comprising at least two plies of the water-dispersible nonwoven substrate of claim 1, at least one of the two plies comprising the structured web and a remainder of the at least two plies comprising one or more plies of the structured web, one or more plies of the unstructured web, or any combination thereof.

15. A method of making the multi-ply water-dispersible nonwoven substrate of claim 14, the method comprising forming two webs of the cellulosic fibers, entangling the cellulosic fibers of each web to form a first ply and a second ply, and joining the first ply to the second ply to form the multi-ply nonwoven substrate.

* * * * *